US011122144B2

(12) United States Patent
Uchibori et al.

(10) Patent No.: US 11,122,144 B2
(45) Date of Patent: *Sep. 14, 2021

(54) INFORMATION PROCESSING SYSTEM, SERVICE PROVIDING SYSTEM, AND INFORMATION PROCESSING METHOD

(71) Applicant: RICOH COMPANY, LTD., Tokyo (JP)

(72) Inventors: Hiroki Uchibori, Tokyo (JP); Akira Kusumoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,167

(22) Filed: Mar. 2, 2020

(65) Prior Publication Data

US 2020/0204644 A1 Jun. 25, 2020

Related U.S. Application Data

(63) Continuation of application No. 15/921,727, filed on Mar. 15, 2018, now Pat. No. 10,587,718.

(30) Foreign Application Priority Data

Mar. 21, 2017 (JP) ................................ 2017-054042

(51) Int. Cl.
*G06F 15/16* (2006.01)
*H04L 29/08* (2006.01)
*H04L 12/58* (2006.01)

(52) U.S. Cl.
CPC ............ *H04L 67/306* (2013.01); *H04L 51/18* (2013.01); *H04L 67/34* (2013.01)

(58) Field of Classification Search
CPC ........ H04L 67/306; H04L 67/34; H04L 51/18
(Continued)

(56) References Cited

U.S. PATENT DOCUMENTS 7,831,657 B2 * 11/2010 Sugishita ................ G06F 9/505
709/203
8,271,788 B2 * 9/2012 Dancer ............... H04L 63/0442
713/171
(Continued)

FOREIGN PATENT DOCUMENTS

JP 2016-091115 5/2016

*Primary Examiner* — Moustafa M Meky
(74) *Attorney, Agent, or Firm* — Xsensus LLP

(57) ABSTRACT

An information processing system includes a client apparatus and a service providing system. The client apparatus includes first circuitry to transmit, to the service providing system, a package acquisition request for obtaining a package including at least one application program. The service providing system includes second circuitry. The second circuitry receives the package acquisition request, and obtains the package. The second circuitry receives, from the client apparatus, an email address and a tenant setup request, and generates a usage registration screen. The second circuitry transmits an email addressed to the email address, the email including a network, and receives an access to the usage registration screen from an information processing apparatus. The second circuitry sets up a tenant in response to acquisition of package identification information, and registers the at least one application program included in the package identified by the package identification information with the tenant.

20 Claims, 24 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,336,062 | B2* | 12/2012 | Murakawa | G06F 9/451 |
| | | | | 719/328 |
| 8,538,028 | B2 | 9/2013 | Yeap | |
| 9,021,020 | B1* | 4/2015 | Ramaswamy | G06Q 30/06 |
| | | | | 709/203 |
| 9,237,153 | B2* | 1/2016 | Francisco | H04L 41/0803 |
| 9,712,660 | B2* | 7/2017 | Marcos | H04M 19/04 |
| 9,747,091 | B1* | 8/2017 | Berg | G06F 9/4451 |
| 9,769,301 | B2* | 9/2017 | Marcos | G06F 8/61 |
| 9,832,651 | B2* | 11/2017 | Korkishko | G06F 21/57 |
| 10,587,718 | B2* | 3/2020 | Uchibori | H04L 67/34 |
| 10,592,187 | B2* | 3/2020 | Marcos | G06F 3/1423 |
| 2004/0230658 | A1* | 11/2004 | Estrada | H04L 29/06027 |
| | | | | 709/206 |
| 2006/0064297 | A1* | 3/2006 | Sugishita | G06F 9/505 |
| | | | | 703/24 |
| 2008/0091947 | A1* | 4/2008 | Dancer | H04L 63/0442 |
| | | | | 713/171 |
| 2008/0118070 | A1 | 5/2008 | Yeap | |
| 2009/0198997 | A1 | 8/2009 | Yeap | |
| 2011/0016474 | A1* | 1/2011 | Sugishita | G06F 9/505 |
| | | | | 719/313 |
| 2012/0127525 | A1 | 5/2012 | Uchibori et al. | |
| 2012/0127527 | A1 | 5/2012 | Nakabayashi et al. | |
| 2012/0260246 | A1* | 10/2012 | Bhattiprolu | G06F 8/61 |
| | | | | 717/176 |
| 2013/0314732 | A1 | 11/2013 | Nakabayashi et al. | |
| 2014/0095880 | A1* | 4/2014 | Keshavachar | G06F 21/10 |
| | | | | 713/171 |
| 2014/0109077 | A1* | 4/2014 | Ashar | G06F 8/70 |
| | | | | 717/171 |
| 2014/0189808 | A1 | 7/2014 | Mahaffey | |
| 2015/0186952 | A1* | 7/2015 | Brown | G06Q 30/0254 |
| | | | | 705/14.52 |
| 2015/0262213 | A1* | 9/2015 | Mercer | G06Q 30/0259 |
| | | | | 705/14.26 |
| 2016/0125174 | A1 | 5/2016 | Matsushima | |
| 2016/0255482 | A1* | 9/2016 | Brown | G06Q 30/0273 |
| | | | | 705/14.64 |
| 2018/0052852 | A1* | 2/2018 | Griesmeyer | G06F 16/24578 |
| 2018/0359352 | A1* | 12/2018 | Marcos | H04W 68/02 |
| 2020/0201588 | A1* | 6/2020 | Marcos | G06F 3/1423 |

* cited by examiner

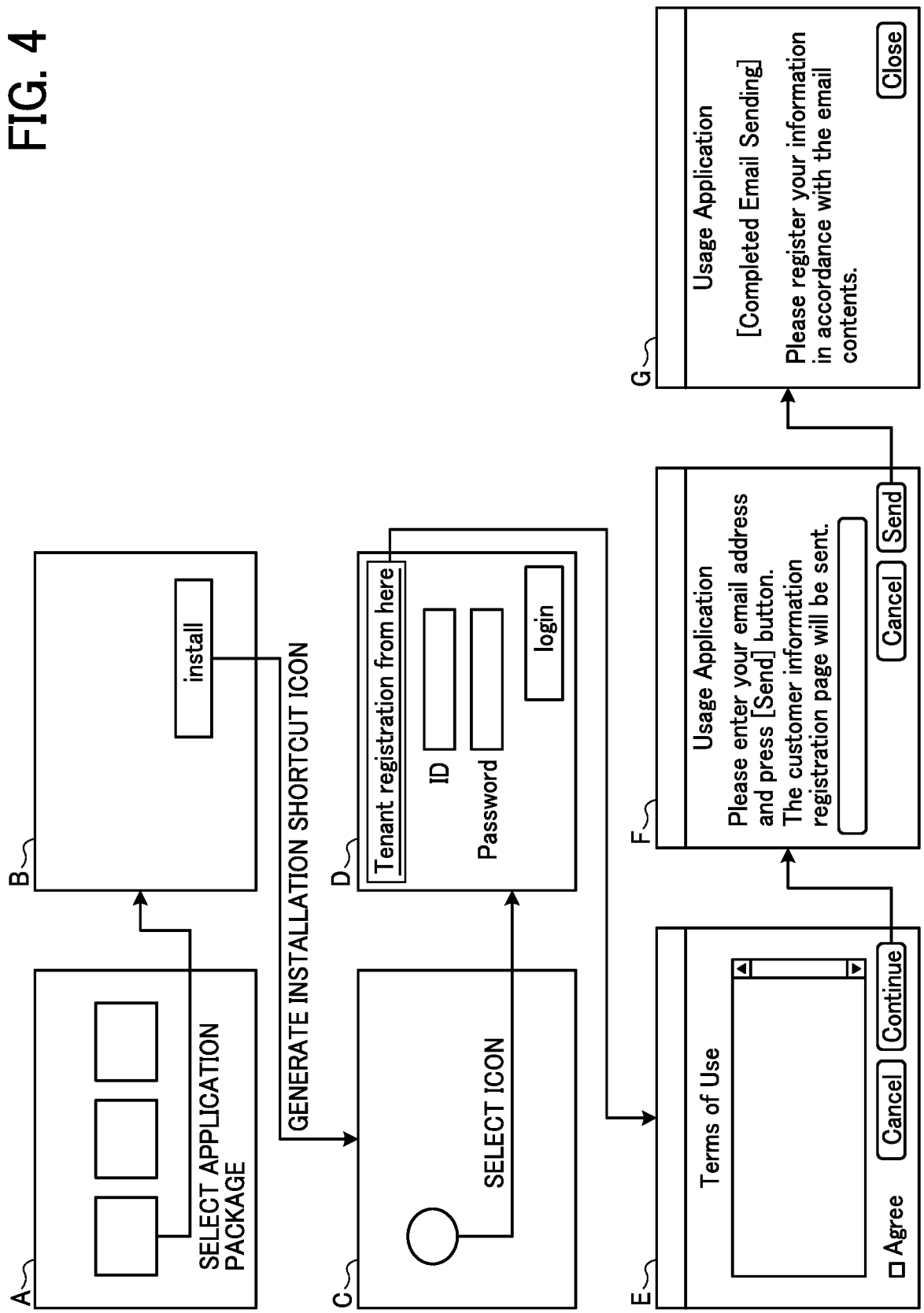

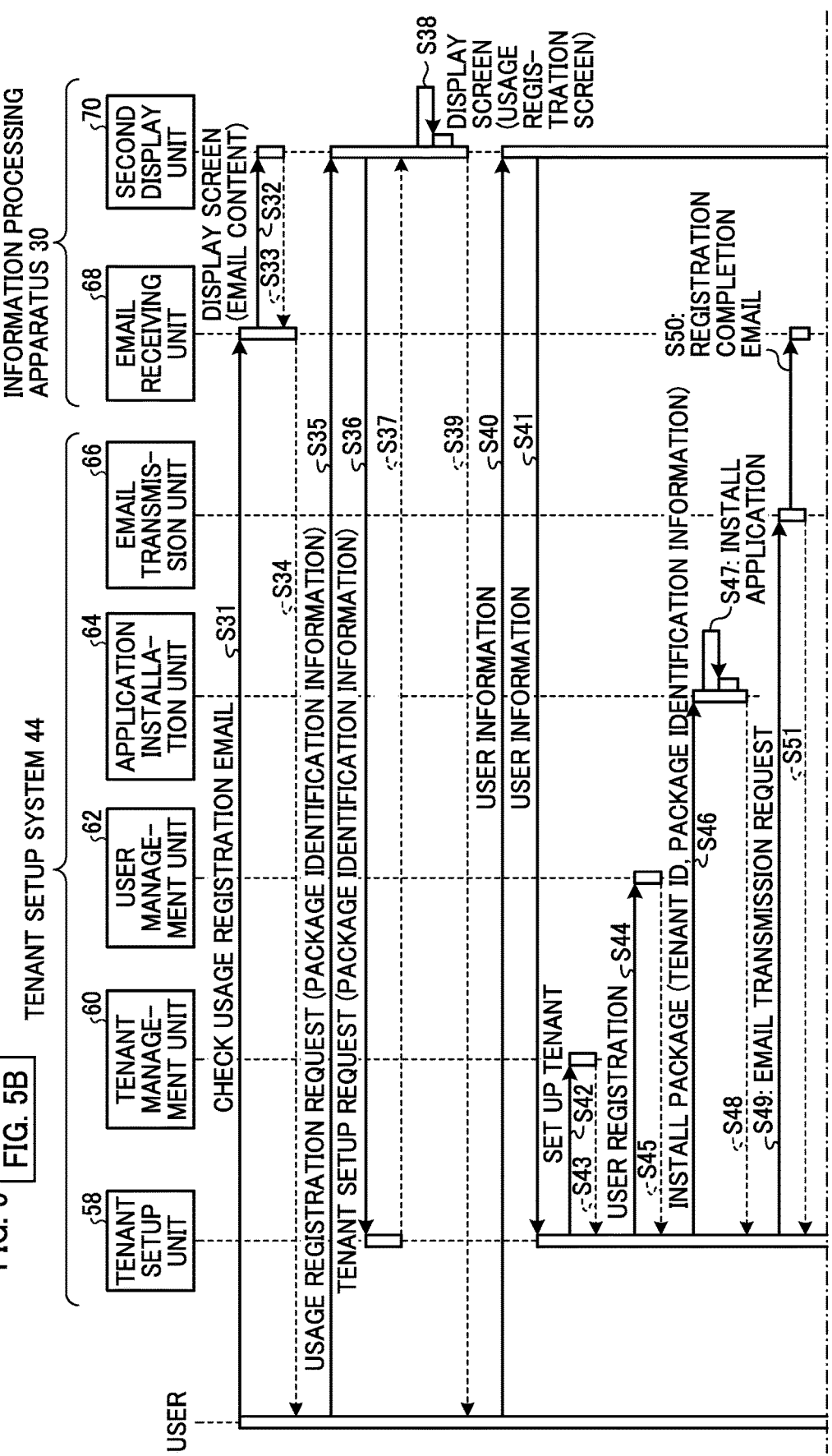

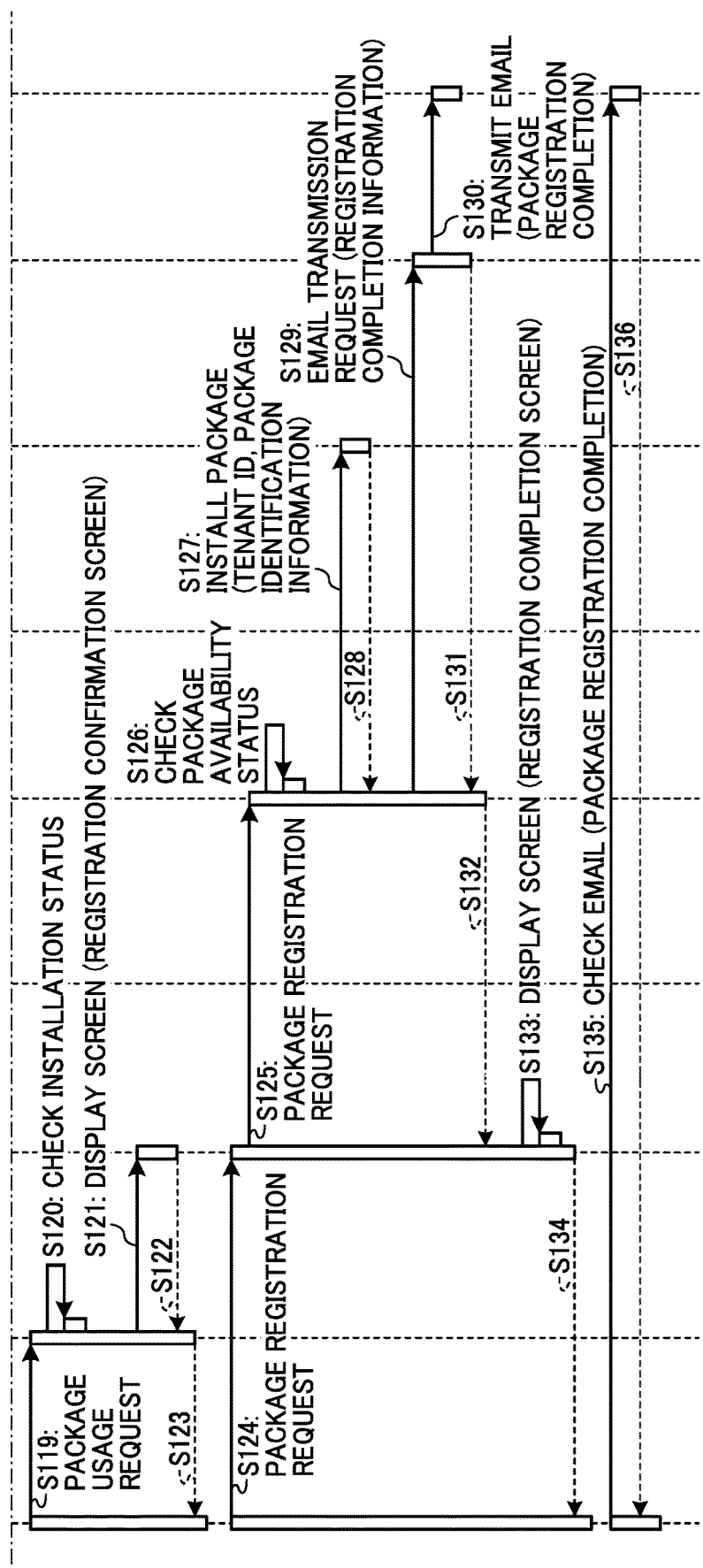

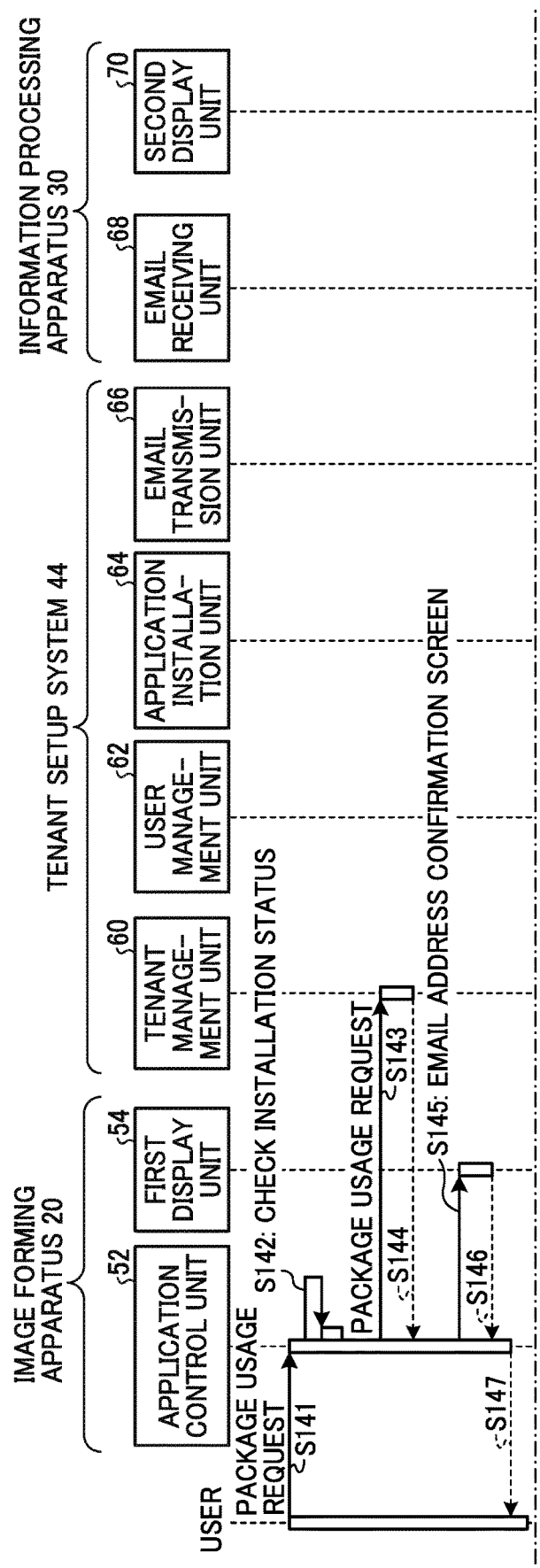

INFORMATION PROCESSING SYSTEM, SERVICE PROVIDING SYSTEM, AND INFORMATION PROCESSING METHOD

CROSS-REFERENCE TO RELATED APPLICATION

This patent application is a continuation Application of U.S. application Ser. No. 15/921,727, filed Mar. 15, 2018, which is based on and claims priority pursuant to 35 U.S.C. § 119(a) to Japanese Patent Application No. 2017-054042, filed on Mar. 21, 2017, in the Japan Patent Office, the entire disclosure of which is hereby incorporated by reference herein.

BACKGROUND

Technical Field

The present disclosure relates to an information processing system, a service providing system, and an information processing method.

Description of the Related Art

Cloud systems are known that provides an information processing service to a client device such as a smartphone for example, via a network such as the Internet. In order to receive a service from such cloud system, a user firstly sets up a service usage environment called a tenant on a server. Subsequently, the user installs an application program (hereinafter also referred to as an application or an app) to be used into the tenant that has been set up, so that the user can use functions of the application installed to the tenant by using a client device.

SUMMARY

An information processing system includes a client apparatus and a service providing system communicable with the client apparatus via a network. The client apparatus includes first circuitry to transmit, to the service providing system, a package acquisition request for obtaining a package including at least one application program. The service providing system includes second circuitry. The second circuitry receives, from the client apparatus, the package acquisition request, and obtains the package including the at least one application program. The second circuitry receives, from the client apparatus, an email address and a tenant setup request, and generates a usage registration screen in accordance with the tenant setup request. The second circuitry transmits an email addressed to the received email address, the email including a network address for accessing the usage registration screen, and receives an access to the usage registration screen from an information processing apparatus. The second circuitry sets up a tenant in response to acquisition of package identification information for identifying the package from the information processing apparatus via the usage registration screen, and registers the at least one application program included in the package identified by the package identification information with the tenant.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4 is a diagram illustrating an example of transition of screens displayed on an image forming apparatus according to an embodiment of the present disclosure;

FIGS. 5A and 5B are a sequence diagram illustrating steps subsequent to the steps in FIG. 3, in the operation performed by the information processing system according to an embodiment of the present disclosure;

FIGS. 14A and 14B are a sequence diagram illustrating steps in an operation performed by the information processing system according to a fifth variation;

FIGS. 16A and 16B are a sequence diagram illustrating steps in an operation performed by the information processing system according to a sixth variation;

Figure 1:
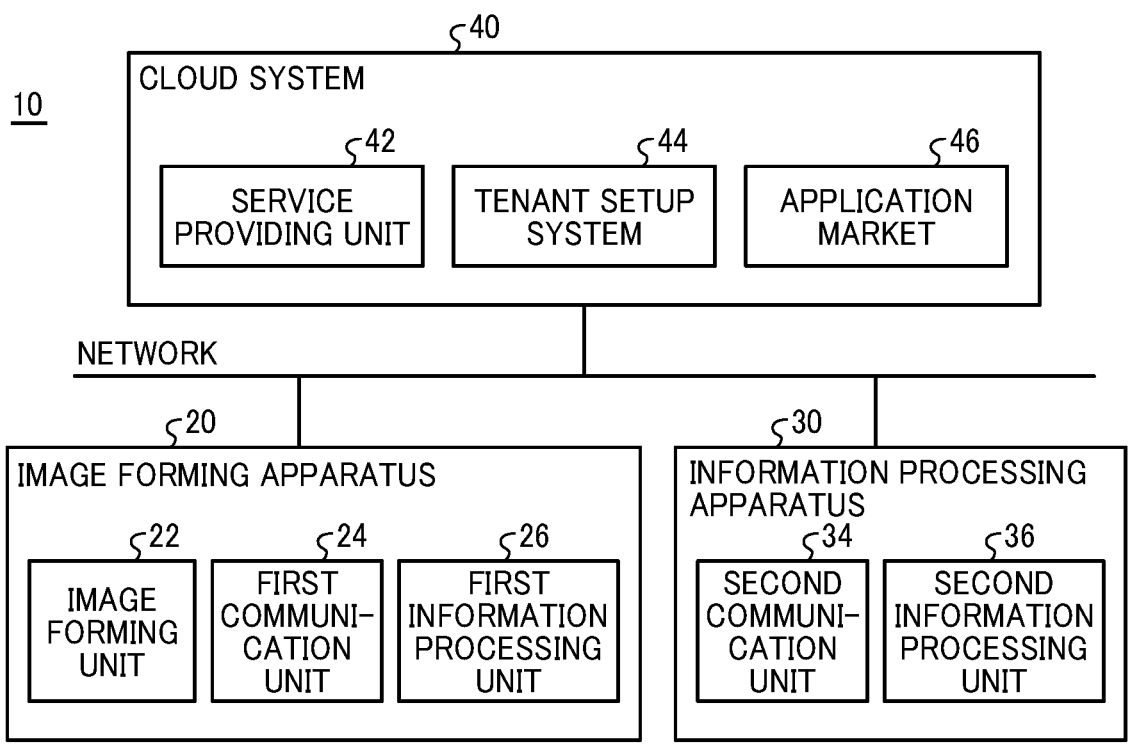
FIG. 1 a block diagram illustrating a configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, embodiments of the present disclosure will be described in detail with reference to drawings. It should be noted that the present disclosure is not limited to those embodiments.

FIG. 1 a block diagram illustrating a configuration of an information processing system 10 according to an embodiment. The information processing system 10 includes an image forming apparatus 20, an information processing apparatus 30, and a cloud system 40. The image forming apparatus 20, the information processing apparatus 30, and the cloud system 40 are connected to each other through a network such as the Internet.

The image forming apparatus 20 is an example of a client apparatus that receives service providing from the cloud system 40. The image forming apparatus 20 includes an image forming unit 22, a first communication unit 24, and a first information processing unit 26.

The image forming unit 22 includes at least one of a scanner and a printer, etc. The image forming unit 22 scans an image formed on a medium such as a sheet of paper to generate image data or prints an image on a medium based on image data. The first communication unit 24 transmits and receives data (information) to and from one or more other apparatuses via the network.

The first information processing unit 26 executes a browser program on an operating system and accesses the cloud system 40 by the browser program. The first information processing unit 26 accepts a user's operation on the browser program. The first information processing unit 26 transmits information to the cloud system 40 according to the operation accepted from the user on the browser program, and displays information acquired from the cloud system 40. Further, the first information processing unit 26 receives a service provided from the cloud system 40 via the browser program. Furthermore, the first information processing unit 26 controls an image forming function according to an operation accepted from the user on the browser program.

The information processing apparatus 30 is a computer having a processor. The information processing apparatus 30 includes a second communication unit 34 and a second information processing unit 36. The second communication unit 34 transmits and receives data (information) to and from one or more other apparatuses via the network. The second information processing unit 36 executes a browser program on an operating system and accesses the cloud system 40 by the browser program. The second information processing unit 36 accepts a user's operation on the browser program. The second information processing unit 36 transmits information to the cloud system 40 according to the operation accepted from the user on the browser program, and displays information acquired from the cloud system 40.

The cloud system 40 is an example of a service providing system that provides an information processing service to apparatuses or devices on the network. In the present embodiment, the cloud system 40 provides the image forming apparatus 20 with a cloud service. The cloud system 40 is implemented by one or more computers (for example, servers). In other words, the cloud system 40 may be implemented by a single computer. Alternatively, functions or processes performed by the cloud system 40 may be distributed over multiple computers.

The cloud system 40 includes a service providing unit 42, a tenant setup system 44, and an application market 46.

In the service providing unit 42, a tenant is set up. The service providing unit 42 executes an application program installed into the tenant that has been set up. Further, the service providing unit 42 provides the client apparatus such as the image forming apparatus 20 on the network with a service implemented by the executed application program.

The tenant setup system 44 sets up a tenant in the service providing unit 42 in accordance with a request from the client apparatus such as the image forming apparatus 20 on the network. Further, the tenant setup system 44 registers a user who uses the tenant that has been set up and installs an application program to the tenant that has been set up, in accordance with a request from the client device such as the image forming apparatus 20 on the network.

The application market 46 downloads an application program to be installed to the tenant from one or more other servers or the like in accordance with a request from the client apparatus such as the image forming apparatus 20 on the network.

Figure 2:
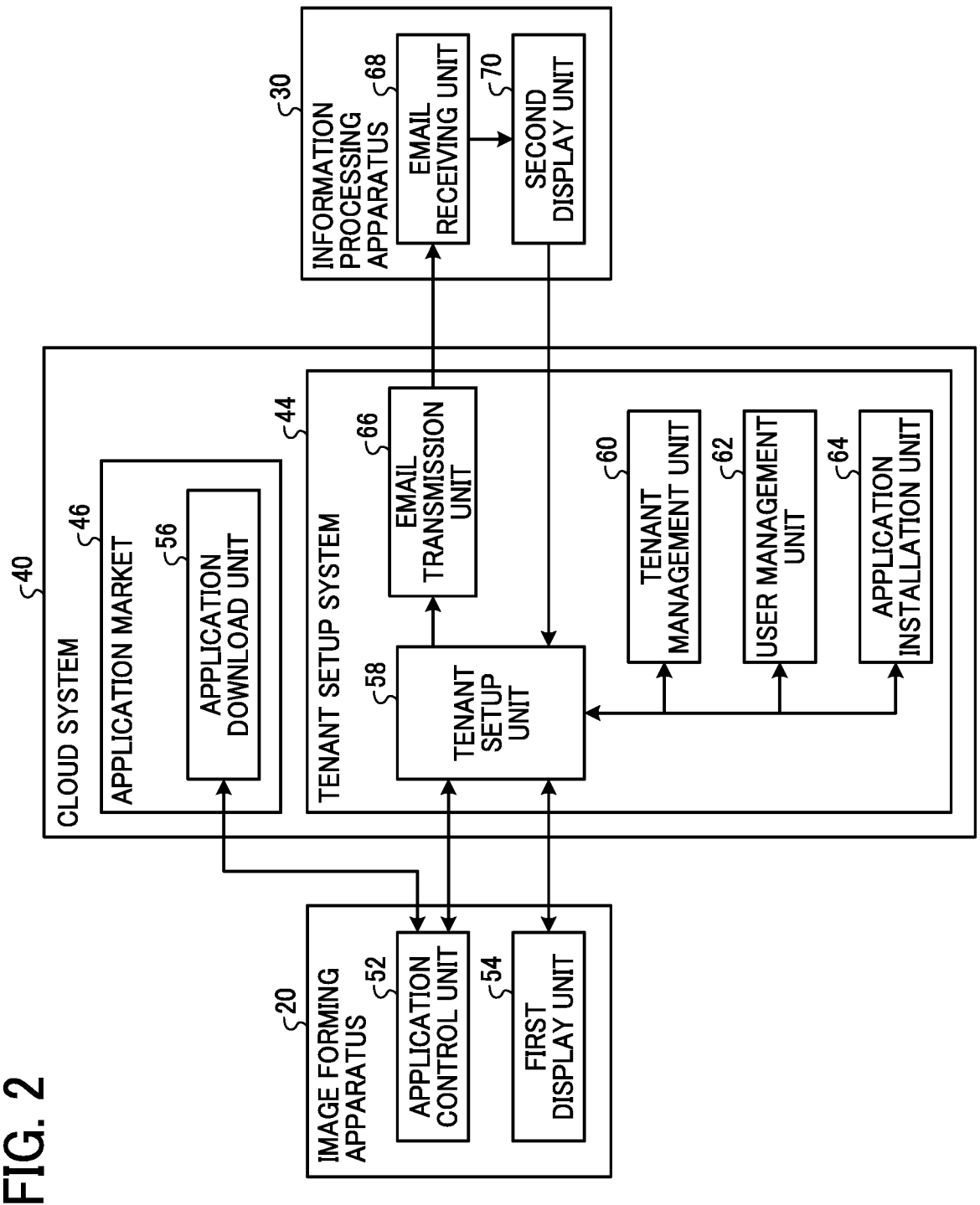
FIG. 2 is a block diagram illustrating a functional configuration of the information processing system according to an embodiment of the present disclosure.

FIG. 2 is a block diagram illustrating a functional configuration of the information processing system 10 according to the embodiment.

The image forming apparatus 20 includes an application control unit 52 and a first display unit 54. The application market 46 of the cloud system 40 includes an application download unit 56. The tenant setup system 44 of the cloud system 40 includes a tenant setup unit 58, a tenant management unit 60, a user management unit 62, an application installation unit 64, and an email transmission unit 66. The information processing apparatus 30 includes an email receiving unit 68 and a second display unit 70.

The application control unit 52 executes processing for various requests for using the application program in accordance with a user's operation. The first display unit 54 displays a screen (screen data) obtained from the cloud system 40.

The application download unit 56 downloads an application program to be installed into the tenant from one or more other servers or the like in accordance with a request from the image forming apparatus 20.

The tenant setup unit 58 sets up a tenant in the service providing unit 42. The tenant executes the application program to provide the image forming apparatus 20 with an information processing service. For example, the tenant setup unit 58 executes a process of setting up a tenant in accordance with a request from the image forming apparatus 20 and the information processing apparatus 30. Further, the tenant setup unit 58 executes a process of registering a user in accordance with a request from the image forming apparatus 20 and the information processing apparatus 30.

The tenant management unit 60 manages the tenant that has been set up. The user management unit 62 manages the registered user.

The application installation unit 64 installs an application program into the tenant that has been set up, to enable the tenant to provide the image forming apparatus 20 with a service. The email transmission unit 66 transmits an email.

The email receiving unit 68 receives an email. The second display unit 70 displays the email received by the email receiving unit 68 and a screen (screen data) obtained from the cloud system 40.

Figure 3:
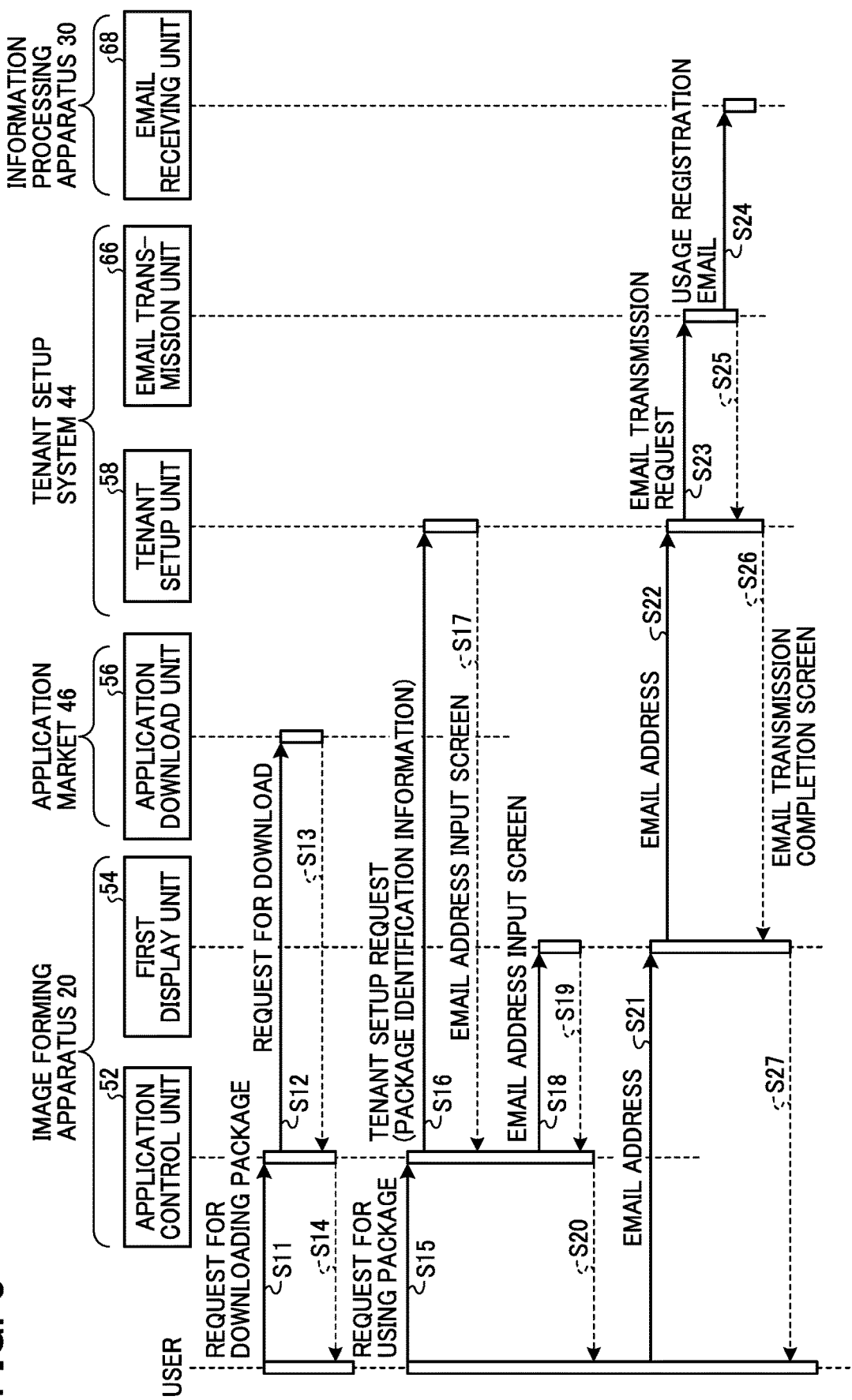
FIG. 3 is a sequence diagram illustrating steps in an operation performed by the information processing system according to an embodiment of the present disclosure.

FIG. 3 is a sequence diagram illustrating steps in an operation performed by the information processing system 10 according to the embodiment. FIG. 4 is a diagram illustrating an example of transition of screens displayed on the image forming apparatus 20.

When the information processing system 10 is to newly set up a tenant and install a plurality of application programs into the set-up tenant, the information processing system 10 starts an operation from steps S11 of FIG. 3.

First, a user operates the image forming apparatus 20 to request a download of a package (step S11). For example, the image forming apparatus 20 displays a package/application list screen as illustrated in A of FIG. 4. For example, the user selects a package that the user wants to install into a tenant from the packages displayed on the package/application list screen of A in FIG. 4.

A package includes at least one application program. In this example, a package includes a plurality of application programs. The package is assigned with package identification information. The package identification information enables the image forming apparatus 20 and the cloud system 40 to identify application programs included in the package.

Next, in response to the user's operation of requesting a download of package, the application control unit 52 transmits a download request to the application market 46 (step S12). For example, when the user's instruction of selecting a package is accepted on the package/application list screen of A in FIG. 4, the image forming apparatus 20 displays a package/application detail screen on which an install button is displayed as illustrated in B of FIG. 4. When the install button displayed on the package/application detail screen of B in FIG. 4 is pressed by the user, the application control unit 52 transmits the download request to the application market 46.

In response to acquisition of the download request from the image forming apparatus 20, the application download unit 56 downloads a plurality of application programs included in the requested package from one or more other servers or the like. When downloading of the application programs is completed, the application download unit 56 transmits a download completion notification including the package identification information to the image forming apparatus 20 (step S13). In response to acquisition of the download completion notification, the application control unit 52 notifies the user that the download has been completed (step S14). As described above with reference to the steps S11 to S14, the image forming apparatus 20 causes the cloud system 40 to obtain a package including at least one application program.

Subsequently, the user operates the image forming apparatus 20 to request the usage of the package (step S15). When downloading of the package is completed, the image forming apparatus 20 displays a home screen C including an installation shortcut icon as illustrated in FIG. 4. The installation shortcut icon accepts an instruction for installing the downloaded package. For example, the user selects the installation shortcut icon on the home screen C illustrated in FIG. 4.

For example, when the installation shortcut icon is selected on the home screen C illustrated in FIG. 4, the image forming apparatus 20 displays a login screen D as illustrated in FIG. 4.

Next, in response to the operation of requesting usage of the package, the application control unit 52 transmits a tenant setup request including the package identification information to the tenant setup system 44 (step S16). On the login screen D illustrated in FIG. 4, a tenant setup request button that accepts an instruction for requesting a tenant setup is displayed. For example, when the tenant setup request button is pressed on the login screen D illustrated in FIG. 4, the image forming apparatus 20 transmits the tenant setup request to the tenant setup system 44.

In response to acquisition of the tenant setup request from the image forming apparatus 20, the tenant setup unit 58 transmits a terms of use screen and an email address input screen to the image forming apparatus 20 (step S17). Subsequently, the application control unit 52 controls the first display unit 54 to display the acquired terms of use screen and email address input screen (steps S18, S19, S20).

Next, the user performs an operation of agreeing to the terms of use displayed on the terms of use screen and an operation of entering an email address (step S21). In response to accepting the operation of agreeing to the terms of use and the operation of entering the email address, the first display unit 54 transmits the entered email address and the package identification information to the tenant setup system 44 (step S22).

For example, the image forming apparatus 20 displays the terms of use screen E as illustrated in FIG. 4 to accept an operation of agreeing to the terms of use. Further, in response to acceptance of the operation of agreeing to the terms of use, the image forming apparatus 20 displays the email address input screen F as illustrated in FIG. 4. In response acceptance of an operation of pressing Send button after the email address has been entered on the email address input screen F illustrated in FIG. 4, the image forming apparatus 20 transmits the email address and the package identification information to the tenant setup system 44. As described above with reference to the steps S15 to S22, the image forming apparatus 20 transmits the tenant setup request including the email address and the package identification information to the tenant setup system 44.

Subsequently, the tenant setup unit 58 receives the tenant setup request from the image forming apparatus 20. In response to reception of the tenant setup request, the tenant setup unit 58 generates a usage registration screen. Then, the tenant setup unit 58 stores the usage registration screen so as to be accessible from an apparatus on the network, in association with the package identification information. Next, the tenant setup unit 58 provides an email transmission request to the email transmission unit 66 (step S23). This email transmission request includes the email address entered by the user, and a network address for accessing the generated usage registration screen. Subsequently, the email transmission unit 66 transmits a usage registration email including the network address for accessing the usage registration screen to the email address (step S24).

Next, the email transmission unit 66 notifies the tenant setup unit 58 that the transmission of the usage registration email is completed (step S25). Subsequently, the tenant setup unit 58 transmits an email transmission completion screen to the image forming apparatus 20 (step S26). Then, the first display unit 54 displays the email transmission completion screen (step S27). For example, the email transmission completion screen G illustrated in FIG. 4 is displayed by the first display unit 54.

Figure 5B:
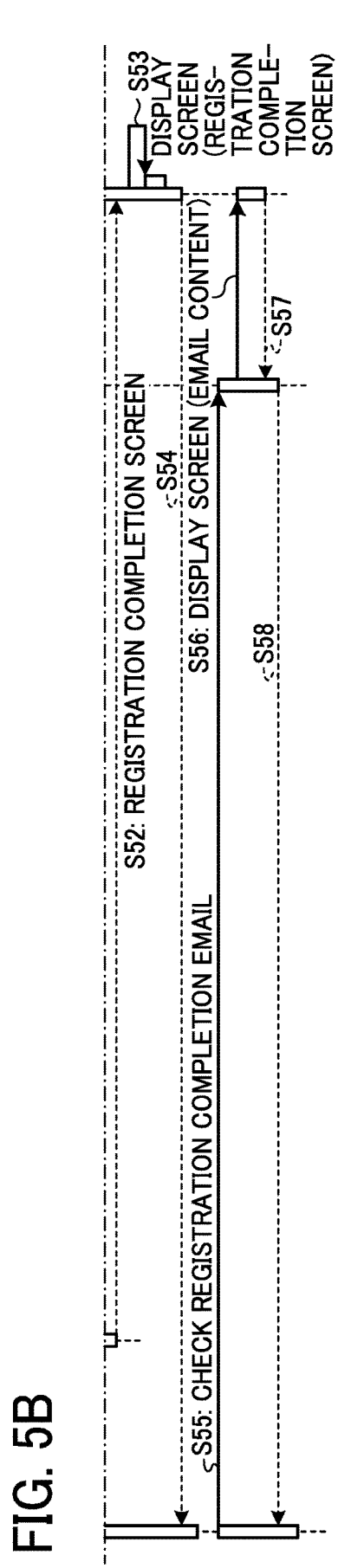
Figure 6:
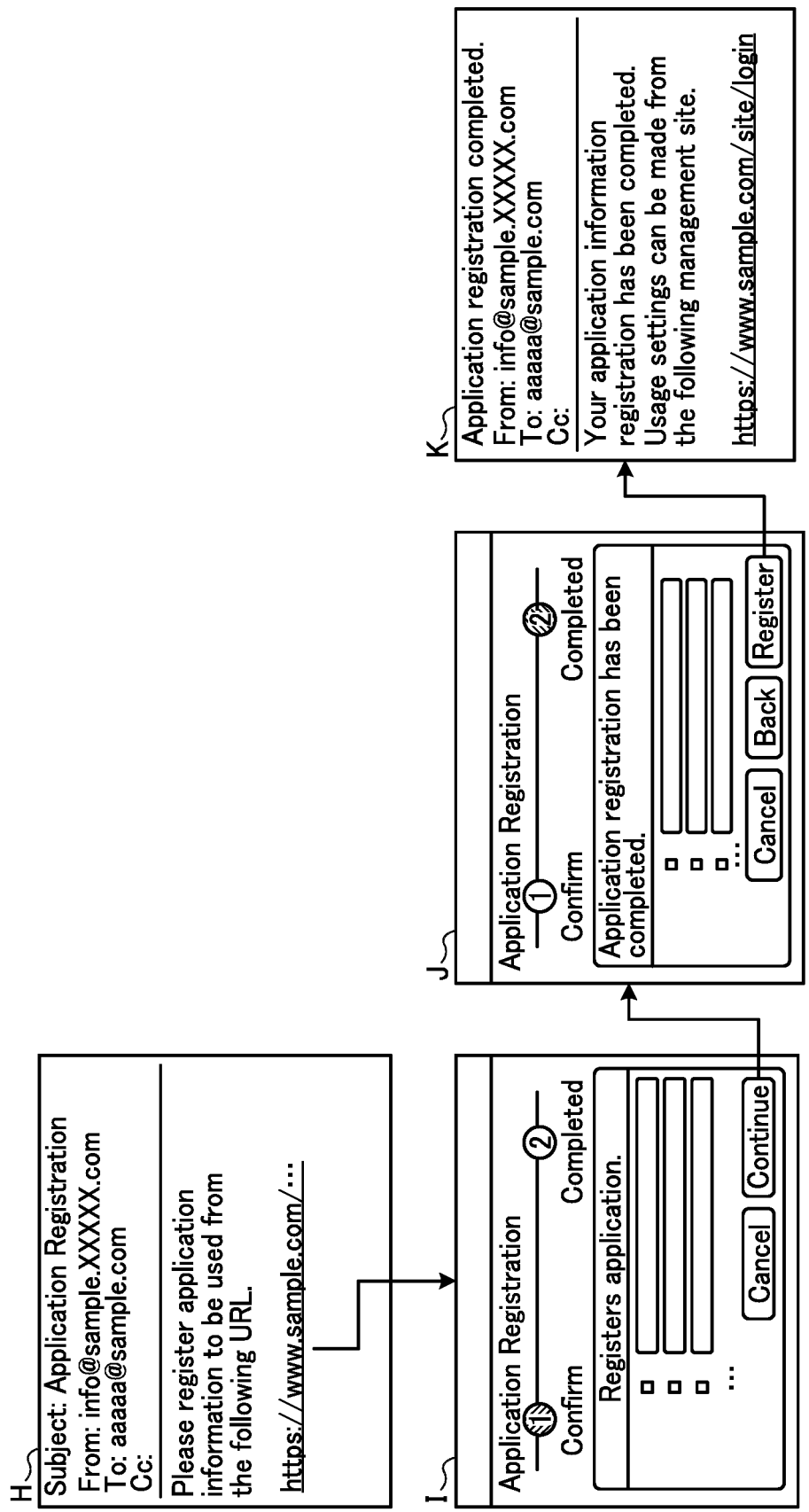
FIG. 6 is a diagram illustrating an example of transition of screens displayed on an information processing apparatus according to an embodiment of the present disclosure.

FIGS. 5A and 5B are a sequence diagram illustrating steps subsequent to the steps in FIG. 3, in the operation performed by the information processing system 10 according to the embodiment. FIG. 6 is a diagram illustrating an example of transition of screens displayed on the information processing apparatus 30.

The information processing system 10 executes the processes from the step S31 of FIG. 5A, subsequent to the processes of FIG. 3.

The user operates the information processing apparatus 30 to check the usage registration email (step S31). In response to the user's operation of checking the usage registration email, the email receiving unit 68 receives the usage registration email and controls the second display unit 70 to display a content of the usage registration email (steps S32, S33, and S34). For example, the information processing apparatus 30 displays the usage registration email H as illustrated in FIG. 6. The usage registration email H illustrated in FIG. 6 includes, in a text section, a network address (e.g., a uniform resource locater (URL)) for accessing the usage registration screen generated by the tenant setup system 44.

Next, the user starts up the browser program executed by the information processing apparatus 30 to access the network address included in the usage registration email. Then, the user enters the package identification information on the screen displayed on the information processing apparatus 30, and performs an operation for transmitting a usage registration request to the tenant setup system 44 (step S35). In response to the operation for transmitting the usage registration request, the second display unit 70 transmits the tenant setup request including the entered package identification information to the tenant setup system 44 (S36).

In response to acquisition of the tenant setup request including the package identification information, the tenant setup unit 58 transmits a usage registration screen to the information processing apparatus 30 (step S37). Subsequently, the second display unit 70 displays the acquired usage registration screen (steps S38, S39).

The user enters user information on the usage registration screen (step S40). Examples of the user information entered by the user include a user identification (ID) and a password. After the user enters the user information on the usage registration screen, the information processing apparatus 30 displays a confirmation screen I as illustrated in FIG. 6 that enables the user to confirm the application programs to be used. In response to a user's operation of confirming the application programs to be used, the second display unit 70 transmits the entered user information to the tenant setup system 44 (step S41).

When the entered user information is valid, the tenant setup unit 58 sets up a tenant (steps S42, S43). Then, the tenant setup unit 58 registers a tenant ID, etc., for identifying the set up tenant in the tenant management unit 60. As described above with reference to S35 to S43, in response to accepting an access to the usage registration screen from the information processing apparatus 30 and in response to acquisition of the package identification information from the information processing apparatus 30 via the usage registration screen, the tenant setup unit 58 sets up a tenant.

Subsequently, based on the entered user information, the tenant setup unit 58 registers a user ID, etc., for identifying a user who uses the tenant in the user management unit 62 (steps S44, S45). As described heretofore, the tenant setup unit 58 registers the user based on the information acquired from the information processing apparatus 30 via the usage registration screen. This enables the tenant setup unit 58 to provide an information processing service to the image forming apparatus 20 operated by the registered user.

Next, the tenant setup unit 58 gives a package installation instruction that includes the tenant ID and the package identification information to the application installation unit 64 (step S46). In response to reception of the package installation instruction, the application installation unit 64 installs a plurality of application programs included in the package identified by the package identification information into the tenant identified by the tenant ID (step S47). For example, the application installation unit 64 installs a plurality of application programs included in the package into the tenant that has been set up. This installation of application programs includes installing the application program into the image forming apparatus 20 belonging to the tenant. The installation of application programs further includes displaying a shortcut icon on an operation screen using the browser program of the image forming apparatus 20 belonging to the tenant, enabling activation of the application program by clicking the shortcut icon. Upon completion of the installation of the application programs, the application installation unit 64 notifies the tenant setup unit 58 that the installation is completed (step S48).

Subsequently, the tenant setup unit 58 provides an email transmission request including registration information to the email transmission unit 66 (step S49). The registration information includes the registered email addresses, etc. In response to reception of the email transmission request, the email transmission unit 66 transmits a registration completion email indicating that registration of the package is completed to the registered email address (step S50). After transmitting the registration completion email, the email transmission unit 66 notifies the tenant setup unit 58 that the registration completion email is transmitted (step S51).

Next, the tenant setup unit 58 transmits a registration completion screen indicating that the registration of package is completed to the information processing apparatus 30 (step S52). Subsequently, the second display unit 70 displays the registration completion screen received from the tenant setup system 44 (steps S53, S54). For, example, the registration completion screen J illustrated in FIG. 6 is displayed by the information processing apparatus 30.

Next, the user operates the information processing apparatus 30 to check the registration completion email (step S55). In response to the user's operation of checking the registration completion email, the email receiving unit 68 receives the registration completion email and controls the second display unit 70 to display a content of the registration completion email (steps S56, S57, and S58). For example, the information processing apparatus 30 displays the registration completion email K illustrated in FIG. 6. The registration completion email K illustrated in FIG. 6 includes, in a text section, a URL for accessing a screen that accepts configuring settings for using the application programs.

After the process of the step S58 is completed, the information processing system 10 finishes an operation for setting up a tenant and installing a plurality of application programs into the tenant that has been set up.

As described heretofore, in the information processing system 10 according to the present embodiment, an operation for causing the tenant setup system 44 to acquire a package is performed from the image forming apparatus 20. This enables to execute the setup of tenant and the installation of application programs included in the package collectively. Thus, the information processing system 10 according the present embodiment enables to install a plurality of application programs into a tenant in a simple manner.

<Variations>

Hereinafter, a description is given of a plurality of variations of the above-described embodiment. In the description of the variations, the same configurations and processes as those described with reference to FIGS. 1 to 6 will be omitted unless necessary.

[Variation 1]

Figure 7:
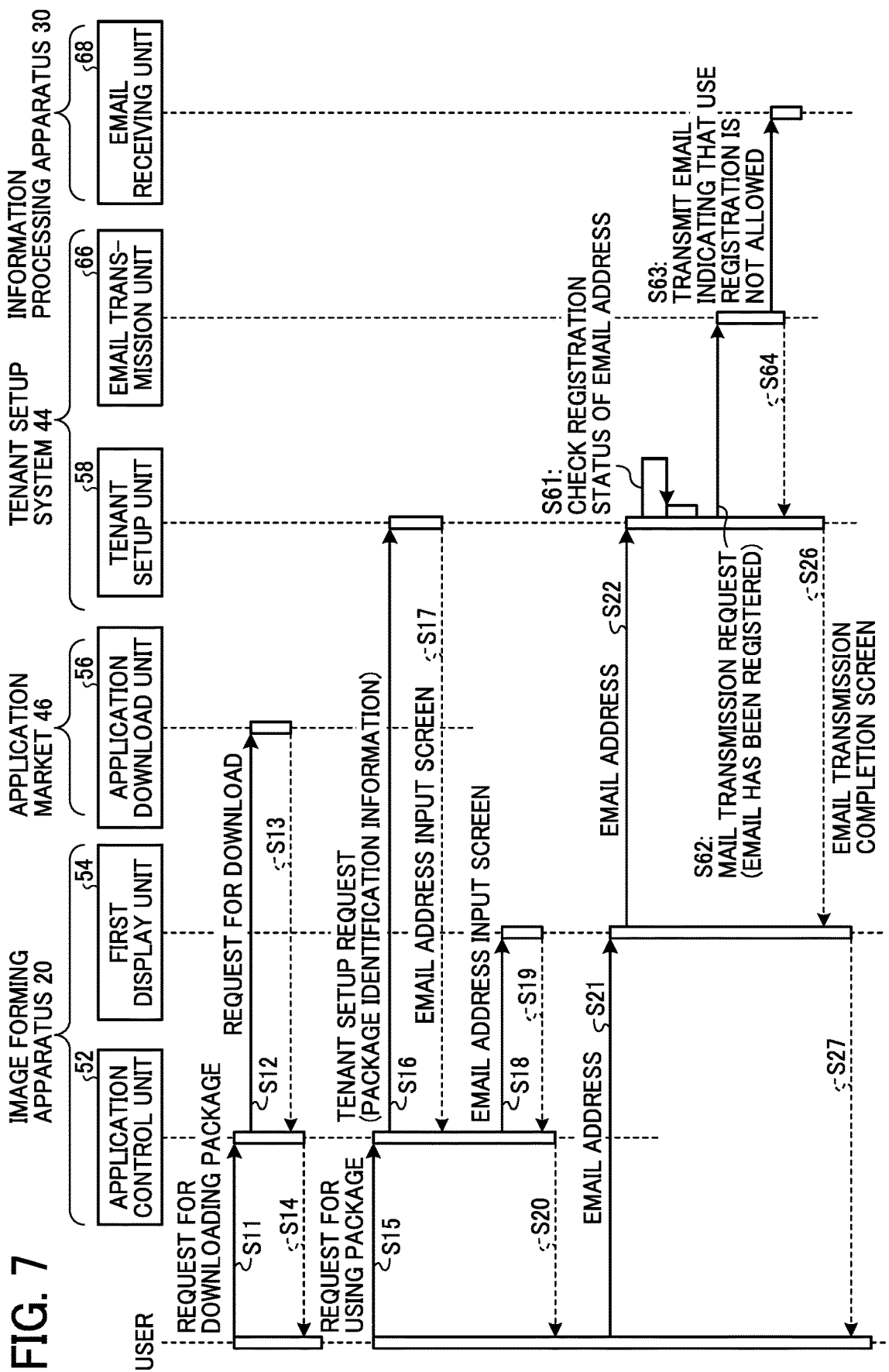
FIG. 7 is a sequence diagram illustrating steps in an operation performed by the information processing system according to a first variation.

FIG. 7 is a sequence diagram illustrating steps in an operation performed by the information processing system 10 according to a first variation. In the first variation, the information processing system 10 performs processes in a flow as illustrated in FIG. 7.

The information processing system 10 according to the first variation performs the same or substantially the same processes as those of the steps S11 to S22 illustrated in FIG. 3. Subsequent to the step S22, the tenant setup unit 58 checks a registration status of the email address (step S61). In a case in which the tenant setup unit 58 determines the email address is not registered yet, the information processing system 10 performs the same processes as those illustrated in FIGS. 3 and 5.

In a case in which the email address is registered, the tenant setup unit 58 provides an email transmission request including information indicating that the email address is registered, to the email transmission unit 66 (step S62).

In response to reception of the email transmission request including the information indicating that the email address is registered, the email transmission unit 66 transmits a denial-of-registration email in place of the usage registration email to the email address (steps S63, S64). Subsequently, the tenant setup unit 58 transmits an email transmission completion screen to the image forming apparatus 20 (step S26). The first display unit 54 displays the email transmission completion screen (step S27). After the step S27, this sequence of the operation by the information processing system 10 ends.

Figure 8:
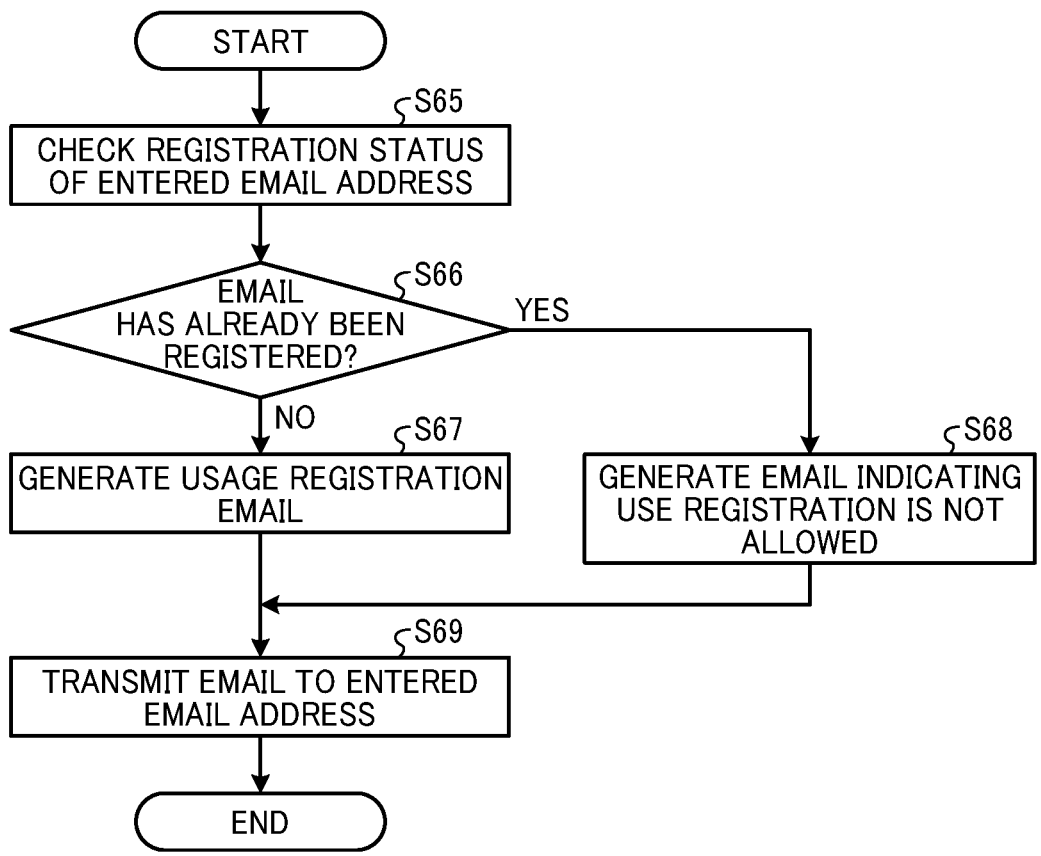
FIG. 8 is a flowchart illustrating an operation performed by a tenant setup system according to the first variation.

FIG. 8 is a flowchart illustrating an operation performed by the tenant setup system 44 according to the first variation. In the first variation, the tenant setup system 44 performs processes illustrated in FIG. 8 in response to reception of an email address entered by a user.

First, in the step S65, the tenant setup unit 58 checks the registration status of the entered email address. Next, in the step S66, the tenant setup unit 58 determines whether the email address is already registered. When the email address is not yet registered (S66: NO), the tenant setup unit 58 generates the usage registration email (step S67). When the email address is already registered (S66: YES), the tenant setup unit 58 generates the denial-of-registration email (step S68).

After the step S67 or S68, the email transmission unit 66 transmits the usage registration email or the denial-of-registration email to the entered email address (step S69).

The information processing system 10 according to the first variation as described is able to prevent the plurality of registrations using the same email address. Thus, the information processing system 10 according to the first variation is able to prevent an erroneous re-registration after the expiry of an expiration date.

[Variation 2]

Figure 9:
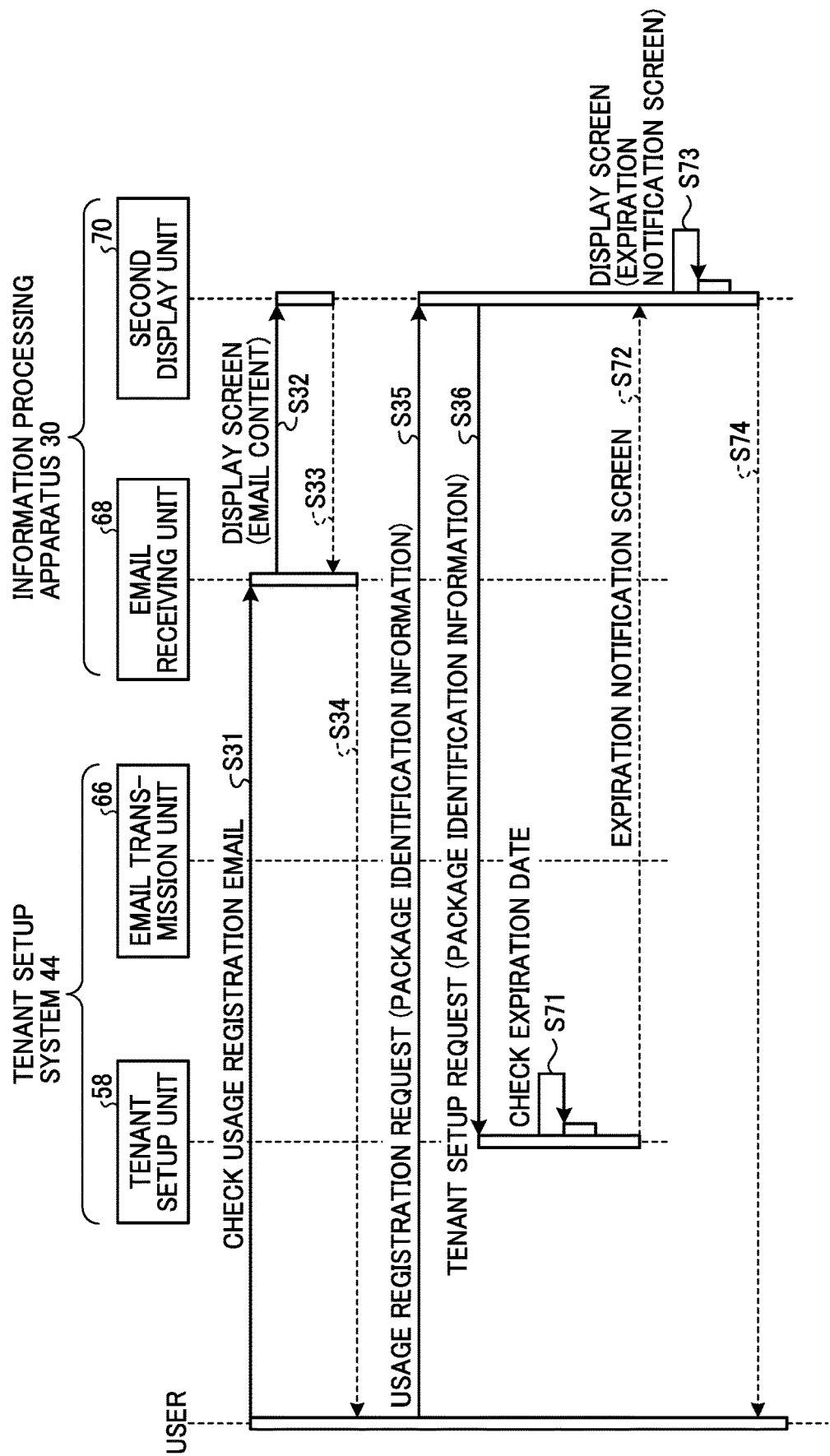
FIG. 9 is a sequence diagram illustrating steps in an operation performed by the information processing system according to a second variation.

FIG. 9 is a sequence diagram illustrating steps in an operation performed by the information processing system 10 according to a second variation. In the second variation, the information processing system 10 performs processes in a flow as illustrated in FIG. 9.

The information processing system 10 according to the second variation performs the same or substantially the same processes as those of the steps S11 to S36 illustrated in FIGS. 3 and 5. In this second variation, the tenant setup unit 58 sets an expiration date to the usage registration screen when generating the usage registration screen in response to the tenant setup request from the image forming apparatus 20. For example, the tenant setup unit 58 sets the expiration date to one hour from the current time or to twenty-four hours from the current time.

Subsequent to the step S36, in response to acquiring the tenant setup request, the tenant setup unit 58 checks the expiration date of the usage registration screen (step S71). When the expiration date has not expired, the tenant setup unit 58 transmits the usage registration screen to the information processing apparatus 30, and performs the subsequent processes. In other words, when the expiration date is not expired, the information processing system 10 performs the same or substantially the same processes as those illustrated in FIGS. 5A and 5B.

By contrast, when the expiration date is expired, the tenant setup unit 58 transmits, to the information processing apparatus 30, an expiration notification screen indicating that the expiration date is expired (step S72). In response to obtaining the expiration notification screen, the second display unit 70 displays the acquired expiration notification screen (steps S73, S74). The tenant setup unit 58 prohibits access to the usage registration screen in subsequent processing. After the step S74, this sequence of the operation by the information processing system 10 ends.

Figure 10:
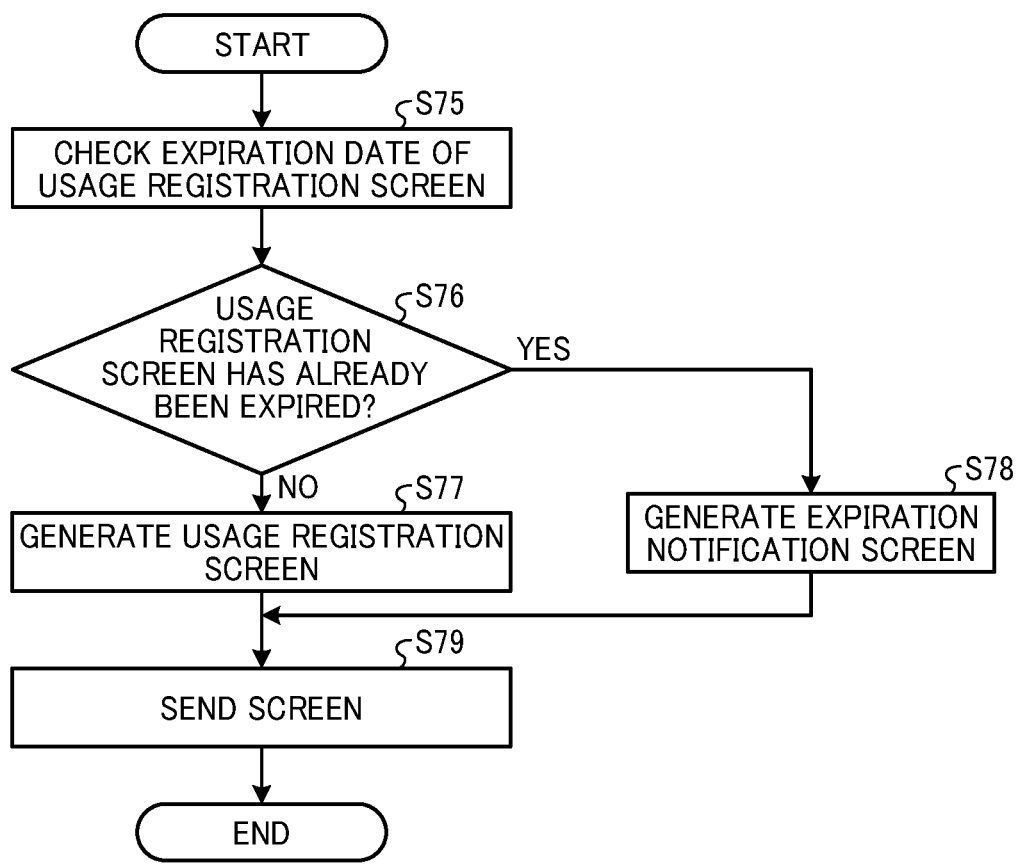
FIG. 10 is a flowchart illustrating an operation performed by the tenant setup system according to the second variation.

FIG. 10 is a flowchart illustrating an operation performed by the tenant setup system 44 according to the second variation. In the second variation, the tenant setup system 44 performs processes illustrated in FIG. 10 in response to acquisition of the tenant setup request from the information processing apparatus 30.

First, the tenant setup unit 58 checks an expiration date of the usage registration screen (S75). Next, the tenant setup unit 58 determines whether the expiration date has expired (S76). When the expiration date is not expired (S76: NO), the tenant setup unit 58 generates the usage registration screen (S77). When the expiration date has expired (S76: YES), the tenant setup unit 58 generates the expiration notification screen (S78).

After the step S77 or S78, the tenant setup unit 58 sends the generated screen back to the information processing apparatus 30 (S79).

As described above, the information processing system 10 according to the second variation sets an expiration date to the usage registration screen. This enables the information processing system 10 to restrict access to the tenant setup system 44, and thereby improving security.

[Variation 3]

Figure 11:
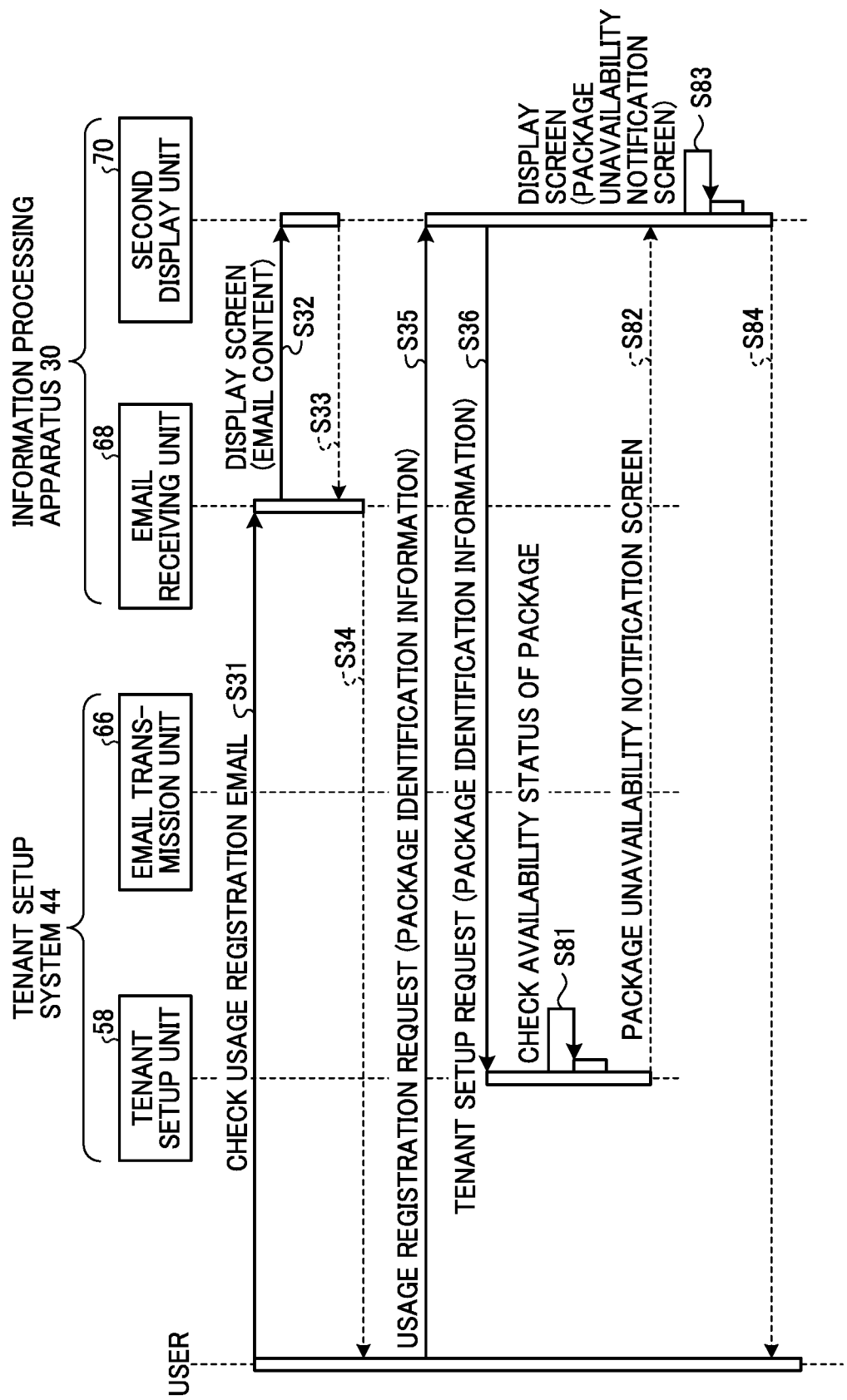
FIG. 11 is a sequence diagram illustrating steps in an operation performed by the information processing system according to a third variation.

FIG. 11 is a sequence diagram illustrating steps in an operation performed by the information processing system 10 according to a third variation. In the third variation, the information processing system 10 performs processes in a flow as illustrated in FIG. 11.

The information processing system 10 according to the third variation performs the same or substantially the same processes as those of the steps S11 to S36 illustrated in FIGS. 3 and 5.

Subsequent to the step S36, in response to acquiring the tenant setup request including the package identification information from the information processing apparatus 30, the tenant setup unit 58 determines whether at least one application program included in the package identified by the package identification information is available (step S81). For example, the tenant setup unit 58 checks whether the providing the at least one application program is terminated or whether the at least one application program is closed to the public. When the at least one application program is available, the tenant setup unit 58 sets up a tenant, and performs the subsequent processes. In other words, when the at least one application program is available, the information processing system 10 performs the same or substantially the same processes as those illustrated in FIGS. 5A and 5B.

By contrast, when the at least one application programs is unavailable, the tenant setup unit 58 does not set up a tenant. In this case, the tenant setup unit 58 transmits, to the information processing apparatus 30, a package unavailability notification screen indicating that the package is unavailable (step S82). In response to acquisition of the package unavailability notification screen, the second display unit 70 displays the acquired package unavailability notification screen (steps S83, S84). The tenant setup unit 58 prohibits access to the usage registration screen in subsequent processing. After the step S84 is ended, this sequence of the operation by the information processing system 10 ends.

Figure 12:
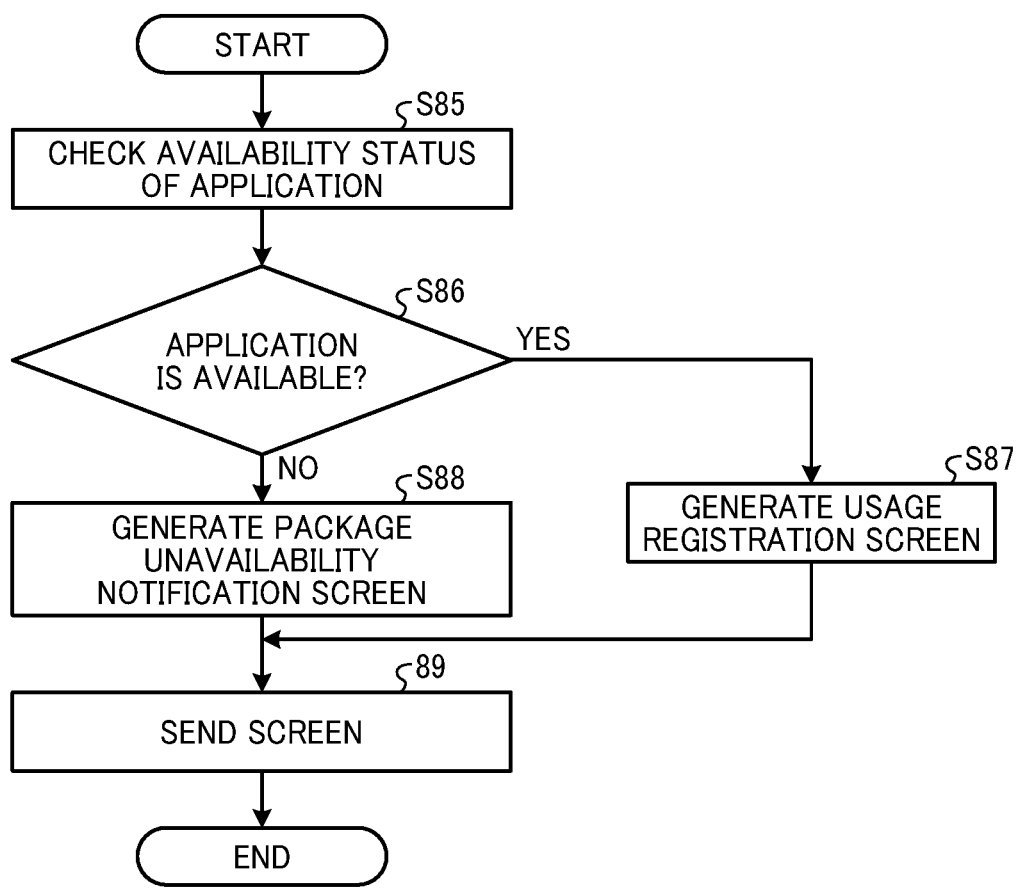
FIG. 12 is a flowchart illustrating an operation performed by the tenant setup system according to the third variation.

FIG. 12 is a flowchart illustrating an operation performed by the tenant setup system 44 according to the third variation. In the third variation, the tenant setup system 44 performs processes illustrated in FIG. 12 in response to acquiring the tenant setup request from the information processing apparatus 30.

First, the tenant setup unit 58 checks an availability status of the application program (step S85). Next, the tenant setup unit 58 determines whether the application program is available (step S86). When the application program is available (S86: YES), the tenant setup unit 58 generates the usage registration screen (step S87). When the application program is no available (S86: NO), the tenant setup unit 58 generates the package unavailability notification screen (step S88).

After the step S87 or S88, the tenant setup unit 58 sends the generated screen back to the information processing apparatus 30 (step S89).

The information processing system 10 according to the third variation as described is able to prevent useless generation of a tenant and useless user registration, in a case in which at least one application program included in the package becomes unavailable or becomes closed to the public during a period from when the package is downloaded until when the usage registration is performed. Accordingly, the information processing system 10 according to the third variation is able to utilize resources in an effective manner. Further, the information processing system 10 according to the third variation is also able to prevent an email address from becoming unavailable on another occasion because the email address has been registered.

[Variation 4]

Figure 13A:
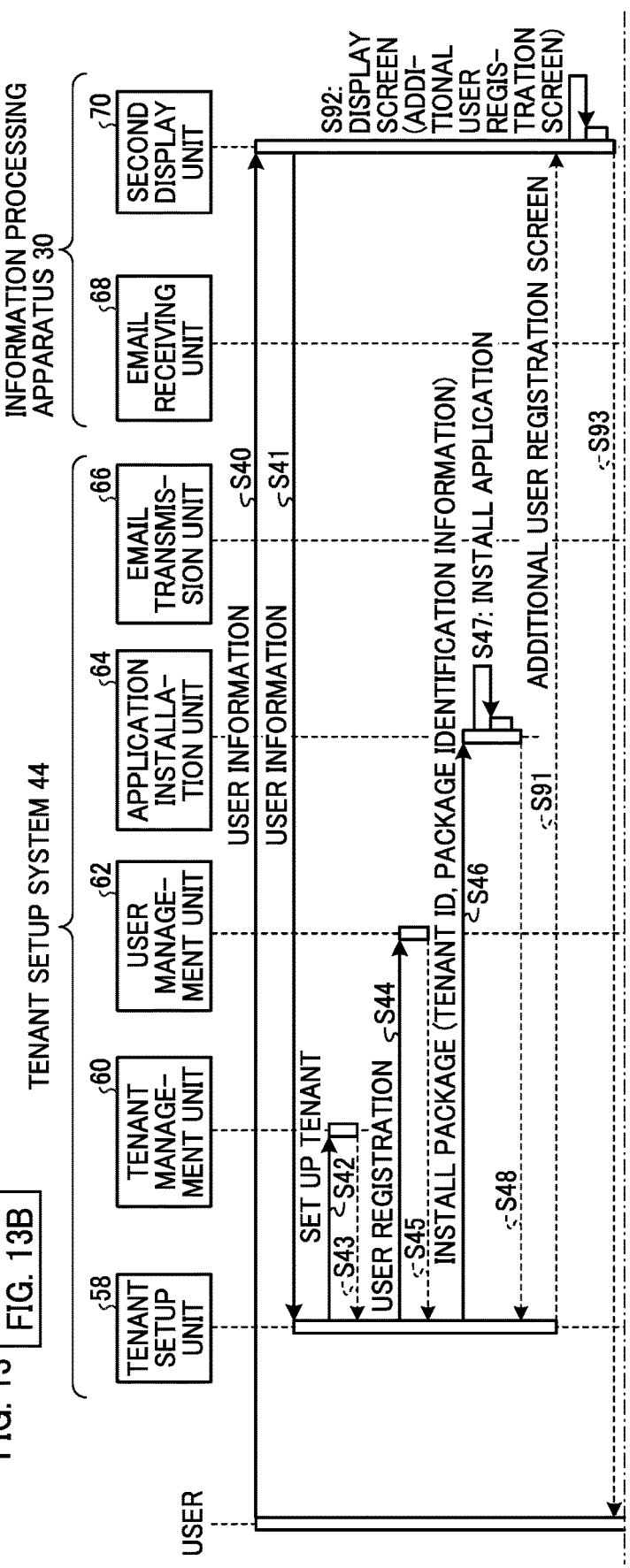
FIGS. 13A and 13B are a sequence diagram illustrating steps in an operation performed by the information processing system according to a fourth variation.
Figure 13B:
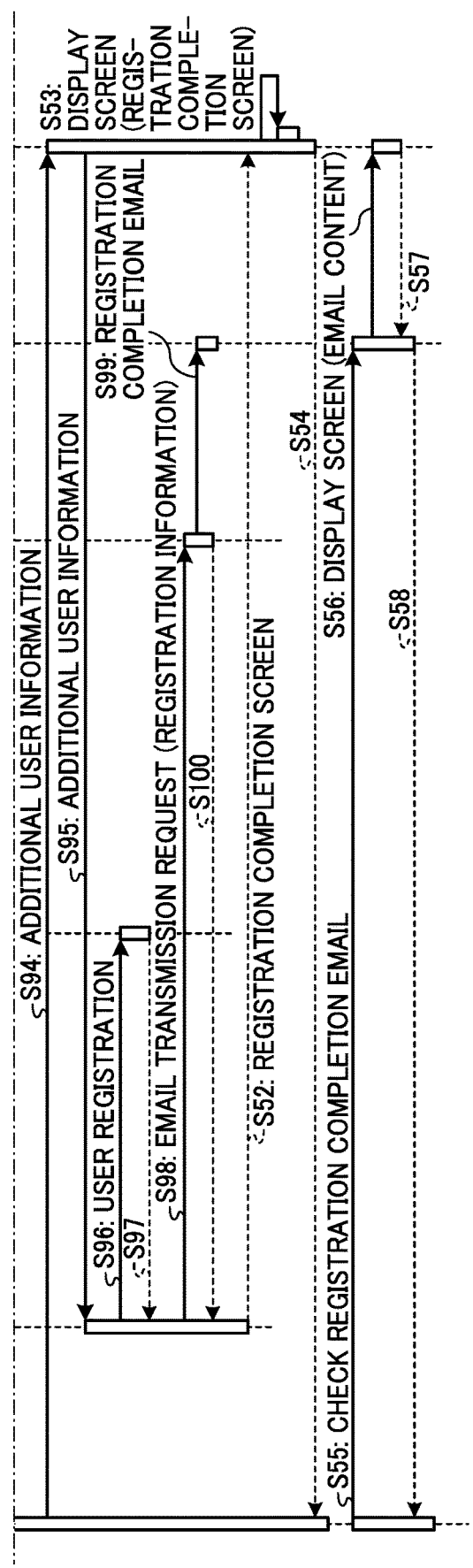

FIGS. 13A and 13B are a sequence diagram illustrating steps in an operation performed by the information processing system 10 according to a fourth variation. In the fourth variation, the information processing system 10 performs processes in a flow as illustrated in FIGS. 13A and 13B.

The information processing system 10 according to the fourth variation performs the same or substantially the same processes as those of the steps S11 to S48 illustrated in FIGS. 3 and 5.

Subsequent to the step S48, after the application program is installed into the tenant, the tenant setup unit 58 transmits, to the information processing apparatus 30, an additional user registration screen that accepts registration of an additional user (step S91). Next, the second display unit 70 displays the acquired additional user registration screen (steps S92, S93).

When the additional user registration screen is displayed, a user performs an operation of entering additional user information about an additional user on the additional user registration screen (step S94). Examples of the additional user information entered by the user include an ID of the additional user. Upon completion of the user's operation of entering the additional user information, the second display unit 70 transmits the entered additional user information to the tenant setup system 44 (step S95).

Subsequently, based on the entered additional user information, the tenant setup unit 58 registers the user ID and the like of the additional user in the user management unit 62 (steps S96, S97). As described above, the tenant setup unit 58 registers the additional user based on the information obtained from the information processing apparatus 30 via the additional user registration screen. This enables the tenant setup unit 58 to provide an information processing service to the image forming apparatus 20 operated by the registered additional user.

Next, the tenant setup unit 58 provides an email transmission request including the registration information about the additional user to the email transmission unit 66 (step S98). In response to reception of the email transmission request, the email transmission unit 66 transmits a registration completion email to the registered email address (step S99). After transmitting the registration completion email, the email transmission unit 66 notifies the tenant setup unit 58 that the registration completion email is transmitted (step S100).

After the step S100, the tenant setup unit 58 performs the same or substantially the same processes to those of the step S52 and subsequent steps in FIG. 5B. It should be noted that the information processing system 10 may repeat the processes from the steps S91 to S100 again after the step S100 to register a plurality of additional users.

The information processing system 10 according to the fourth variation as described registers an additional user(s) together with the setup of a tenant and the installation of an application program. Thus, the information processing system 10 according to the fourth variation is able to register a plurality of users in a tenant by a simple procedure.

[Variation 5]

Figure 14A:
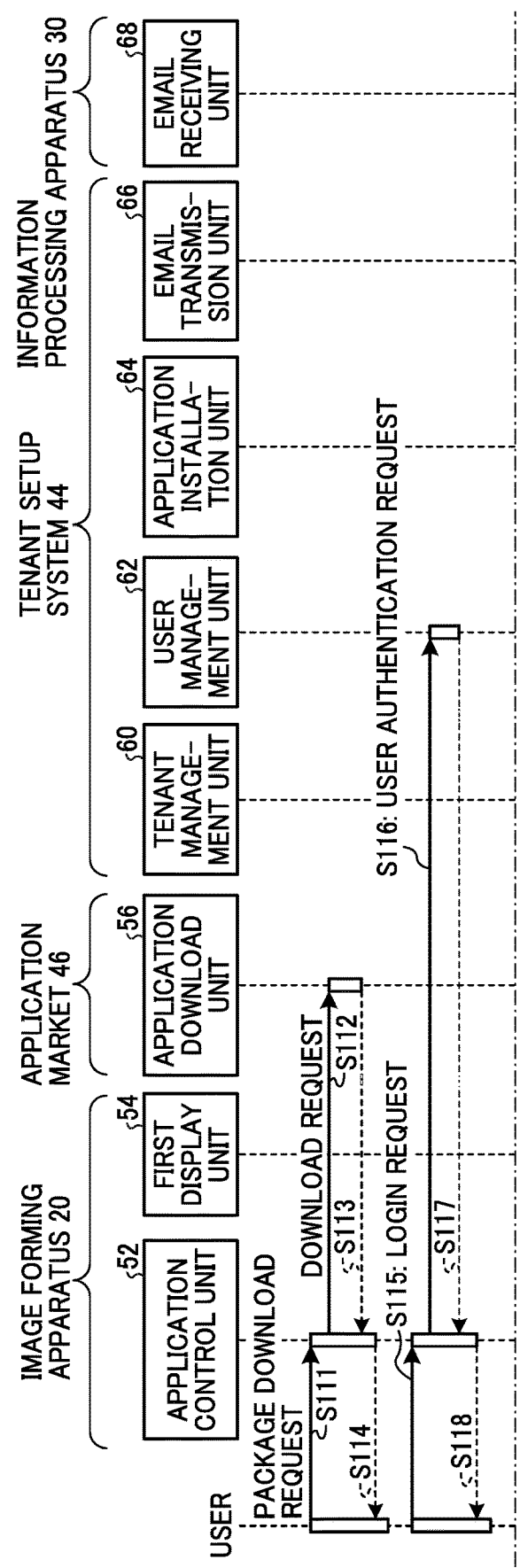
Figure 15:
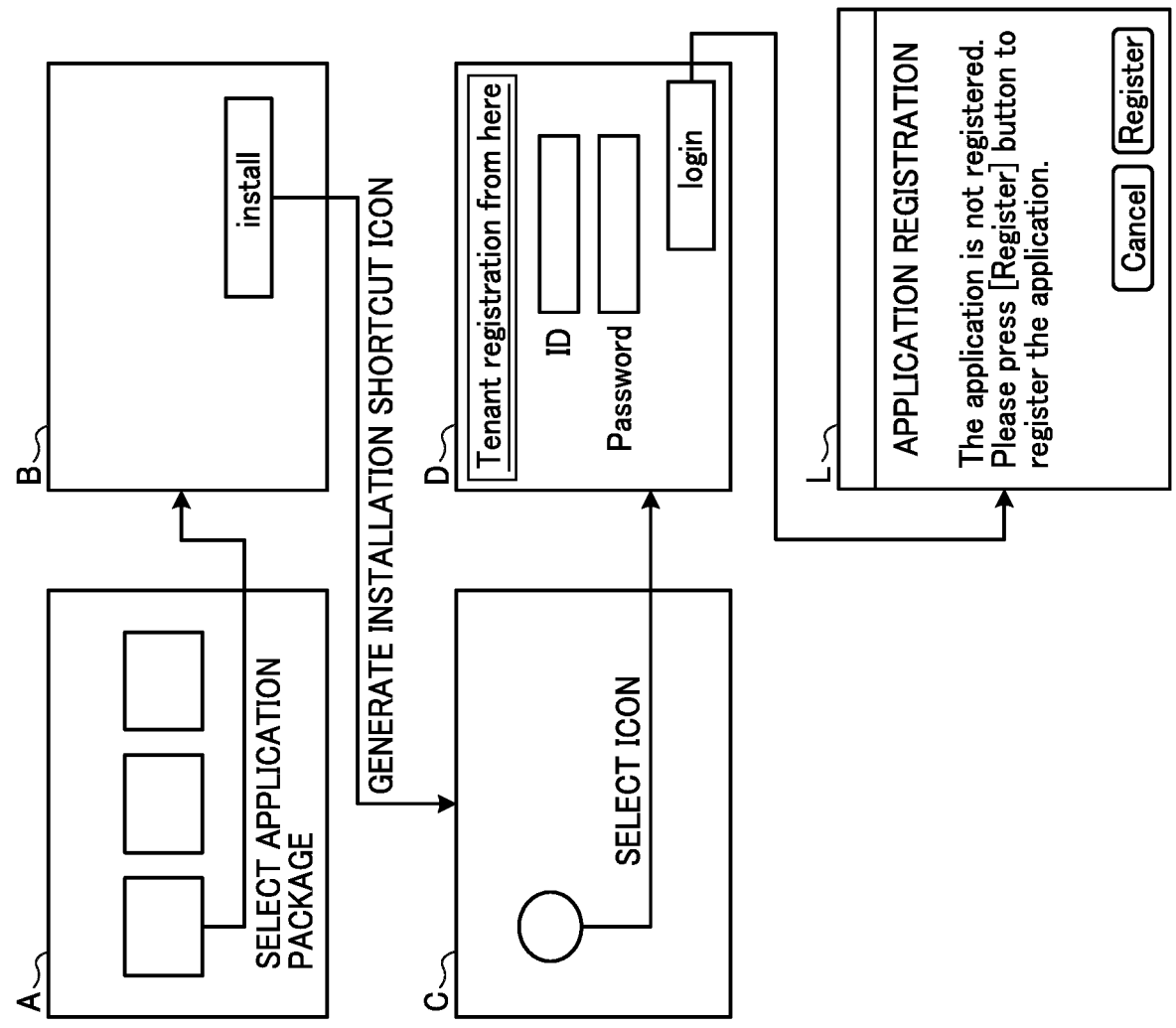
FIG. 15 is a diagram illustrating an example of transition of screens displayed on the image forming apparatus according to the fifth variation.

FIGS. 14A and 14B are a sequence diagram illustrating steps in an operation performed by the information processing system 10 according to a fifth variation. FIG. 15 is a diagram illustrating an example of transition of screens displayed on the image forming apparatus 20 according to the fifth variation.

In the fifth variation, the information processing system 10 performs processes in a flow as illustrated in FIGS. 14A and 14B. In the fifth variation, the tenant setup system 44 has already set up a tenant in accordance with a request from the image forming apparatus 20 and the information processing apparatus 30. However, an application program is not installed into the tenant that has been set up.

First, a user operates the image forming apparatus 20 to request a download of a package (S111). For example, the image forming apparatus 20 displays a package/application list screen A as illustrated in FIG. 15. For example, the user selects a package that the user wants to install into the tenant from the packages displayed on the package/application list screen A in FIG. 15.

Next, in response to the user's operation of requesting a download of package, the application control unit 52 transmits a download request to the application market 46 (step S112). For example, when the user's operation of selecting a package is accepted on the package/application list screen A in FIG. 15, the image forming apparatus 20 displays a package/application detail screen B on which an install button is displayed as illustrated in FIG. 15. When the install button displayed on the package/application detail screen B illustrated in FIG. 15 is pressed by the user, the application control unit 52 transmits the download request to the application market 46.

In response to acquiring the download request from the image forming apparatus 20, the application download unit 56 downloads a plurality of application programs included in the requested package from one or more other servers or the like. When downloading of the application programs is completed, the application download unit 56 transmits a download completion notification including the package identification information to the image forming apparatus 20 (step S113). In response to obtaining the download completion notification, the application control unit 52 notifies the user that the download has been completed (step S114).

Subsequently, the user operates the image forming apparatus 20 to request login (step S115). When downloading of the package is completed, the image forming apparatus 20 displays a home screen C including an installation shortcut icon as illustrated in FIG. 15. The installation shortcut icon accepts an instruction for installing the downloaded package. For example, the user selects the installation shortcut icon C on the home screen C illustrated in FIG. 15.

For example, when the installation shortcut icon is selected on the home screen C illustrated in FIG. 15, the image forming apparatus 20 displays a login screen D as illustrated in FIG. 15. On the login screen D illustrated in FIG. 15, the user enters a user ID and a password, and presses a login button. When the login button is pressed on the login screen D illustrated in FIG. 15, the image forming apparatus 20 accepts a login request.

Next, in response to the operation of requesting a login, the application control unit 52 transmits a user authentication request to the tenant setup system 44 (step S116). In response to reception of the user authentication request from the image forming apparatus 20, the user management unit 62 performs user authentication. The user management unit 62 transmits a result of the user authentication to the image forming apparatus 20 (step S117). The application control unit 52 notifies the user of the result of user authentication (step S118).

Subsequently, the user operates the image forming apparatus 20 to request the usage of the package (step S119). In response to the user's operation of requesting the usage of package, the application control unit 52 checks whether the application programs included in the package are installed (step S120). When the application programs included in the package are installed, the application control unit 52 notifies the user that the application programs are installed. When the application programs are installed, this sequence of the operation by the information processing system 10 ends.

When the application programs are not yet installed, the application control unit 52 controls the first display unit 54 to display a registration confirmation screen that enables a user to confirm whether to install the package (steps S121, S122, and S123). L of FIG. 15 is an example of the registration confirmation screen displayed by the image forming apparatus 20.

Subsequently, the user operates the image forming apparatus 20 to request the registration of the package (step S124). In response to the user's operation of requesting the registration of the package, the first display unit 54 transmits a package registration request including the package identification information to the tenant setup system 44 (step S125). For example, when a registration button on the registration confirmation screen L in FIG. 15 is pressed, the image forming apparatus 20 transmits the package registration request.

In response to acquiring the package registration request from the image forming apparatus 20, the tenant management unit 60 checks whether at least one application program included in the package identified by the package identification information is available (step S126). When the at least one application program is unavailable, the tenant management unit 60 sends the package unavailability notification screen back to the image forming apparatus 20. Then, the operation ends. In other words, when the at least one application program is unavailable, this sequence of the operation by the information processing system 10 ends.

When the at least one application program is available, subsequently, the tenant management unit 60 gives a package installation instruction including the tenant ID and the package identification information, to the application installation unit 64 (step S127). In response to reception of the package installation instruction, the application installation unit 64 installs a plurality of application programs included in the package identified by the package identification information into the tenant identified by the tenant ID. For example, the application installation unit 64 installs the plurality of application programs included in the package into the tenant. Upon completion of the installation of the application programs, the application installation unit 64 notifies the tenant management unit 60 that the installation is completed (step S128).

Subsequently, the tenant management unit 60 provides an email transmission request including the registration information to the email transmission unit 66 (step S129). In response to reception of the email transmission request, the email transmission unit 66 transmits a registration completion email indicating that registration of the package is completed to the registered email address (step S130). After transmitting the registration completion email, the email transmission unit 66 notifies the tenant management unit 60 that the registration completion email is transmitted (step S131).

Next, the tenant management unit 60 transmits the registration completion screen to the image forming apparatus 20 (step S132). Subsequently, the first display unit 54 displays the registration completion screen obtained from the tenant setup system 44 (steps S133, S134).

Next, the user operates the information processing apparatus 30 to check the registration completion email (step S135). In response to the user's operation of checking the registration completion email, the email receiving unit 68 receives the registration completion email and controls the second display unit 70 to display a content of the registration completion email (step S136).

Upon completion of the process of the step S136, the operation by the information processing system 10 for installing a plurality of application programs into a tenant that is set up ends.

The information processing system 10 according to the fifth variation as described enables an operation from the image forming apparatus 20 to control the tenant setup system 44 to acquire a package even after the setup of a tenant. Thus, according to the information processing system 10 according to the fifth variation, a plurality of application programs are installed in a simple manner by operating the image forming apparatus 20.

[Variation 6]

Figure 16B:
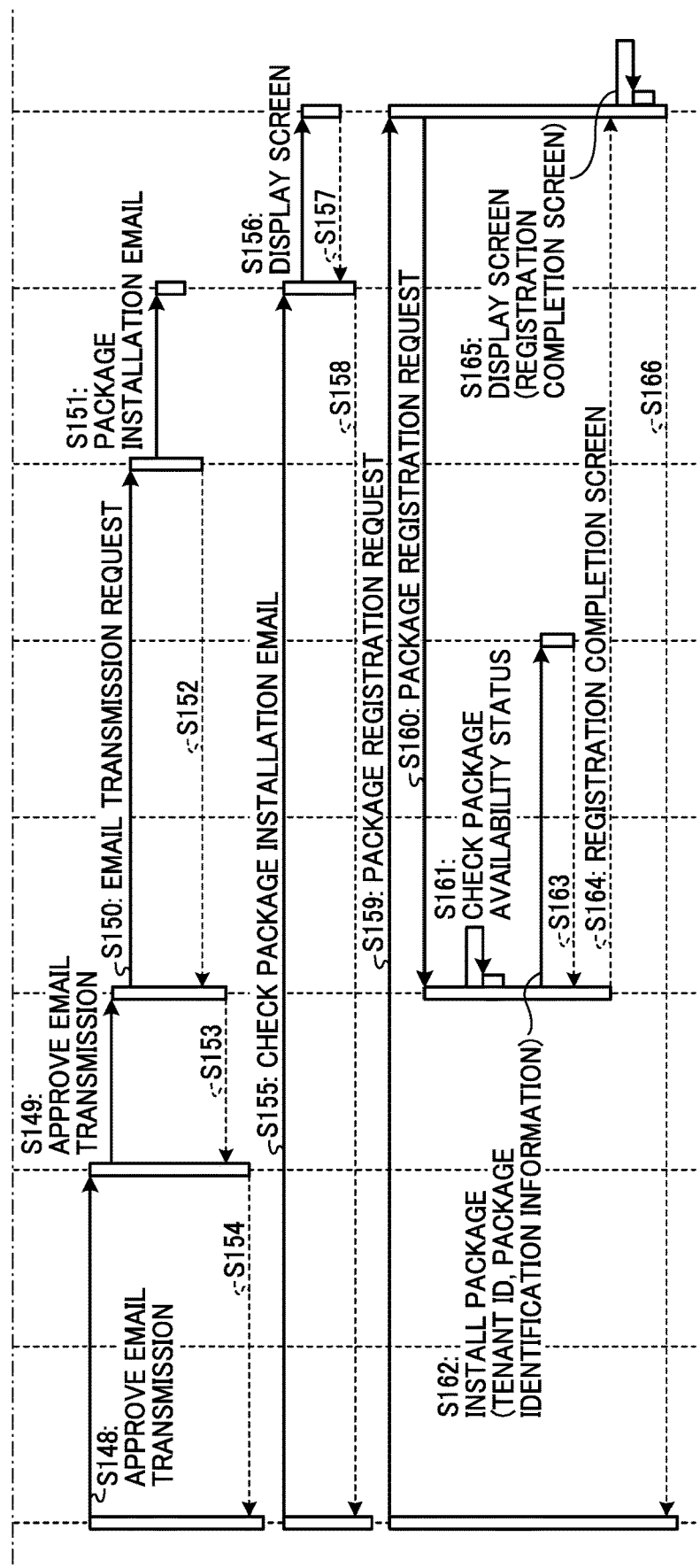
Figure 17:
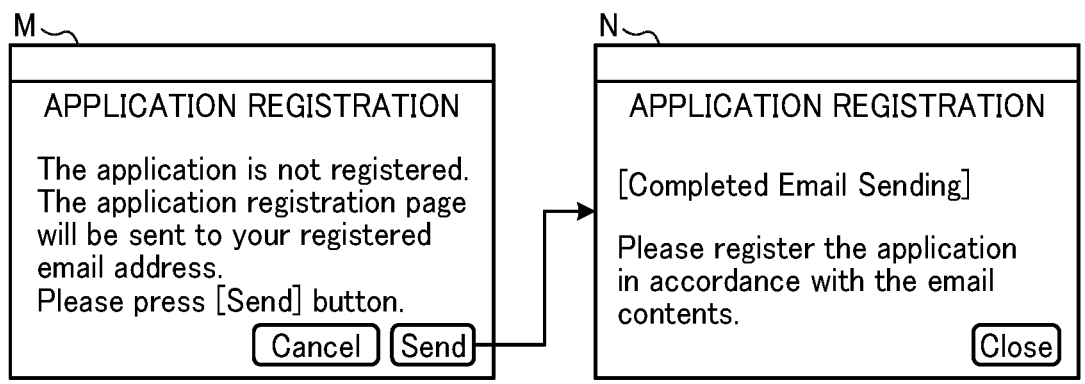
FIG. 17 is a diagram illustrating an example of transition of screens displayed on the image forming apparatus according to the sixth variation.
Figure 18:
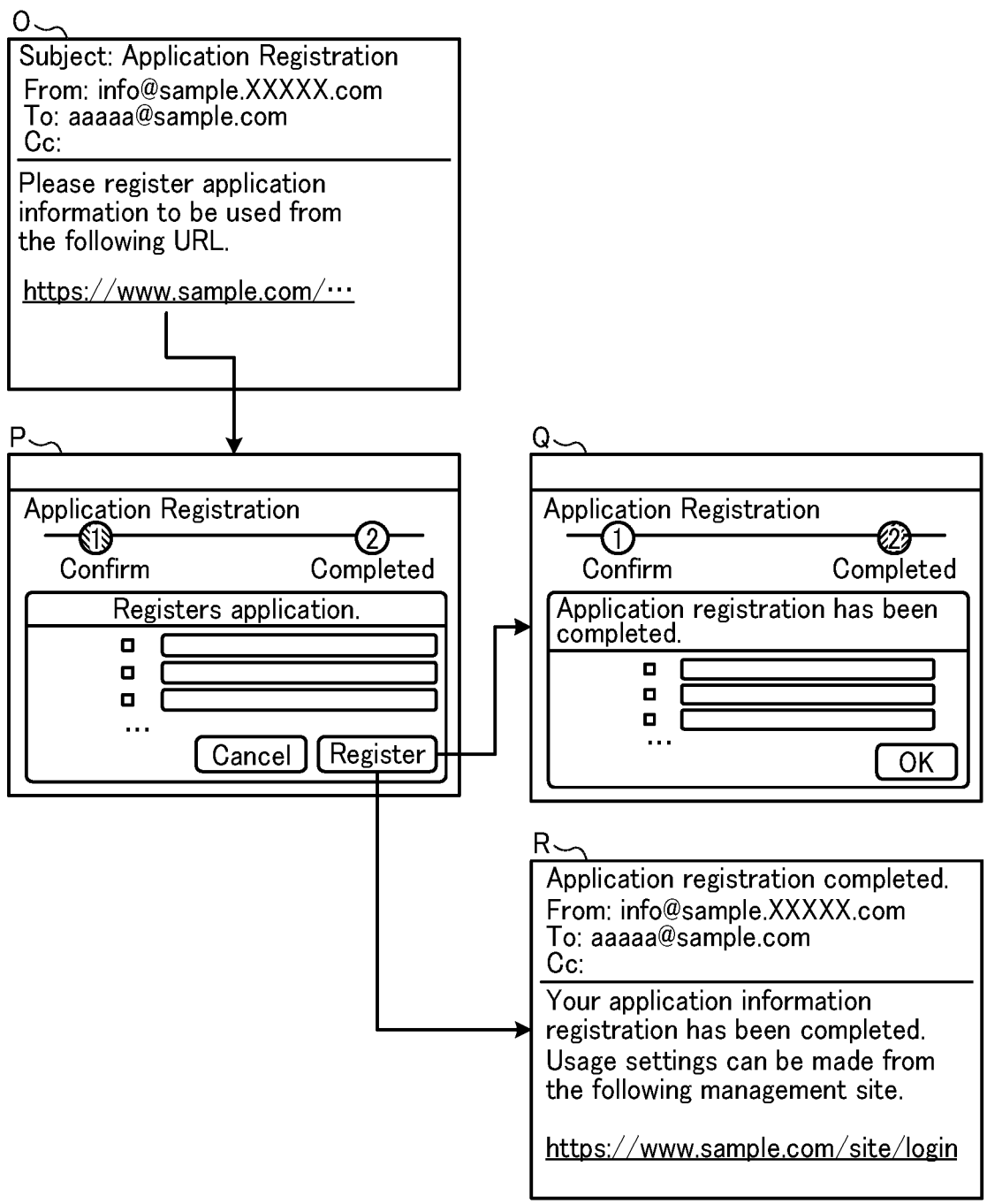
FIG. 18 is a diagram illustrating an example of transition of screens displayed on the information processing apparatus according to the sixth variation.

FIGS. 16A and 16B are a sequence diagram illustrating steps in an operation performed by the information processing system 10 according to a sixth variation. FIG. 17 is a diagram illustrating an example of transition of screens displayed on the image forming apparatus 20 according to the sixth variation. FIG. 18 is a diagram illustrating an example of transition of screens displayed on the information processing apparatus 30 according to the sixth variation.

In the sixth variation, the information processing system 10 performs processes in a flow as illustrated in FIGS. 16A and 16B. In the sixth variation, the tenant setup system 44 has already set up a tenant in accordance with a request from the image forming apparatus 20 and the information processing apparatus 30. However, an application program is not installed into the tenant that has been set up.

First, the information processing system 10 according to the sixth variation performs the same or substantially the same processes as those of the steps S111 to S118 illustrated in FIG. 14A.

Subsequent to the step S118, a user operates the image forming apparatus 20 to request the usage of the package (step S141). In response to the user's operation of requesting the usage of package, the application control unit 52 checks whether the application programs included in the package are installed (step S142). When the application programs included in the package are installed, the application control unit 52 notifies the user that the application programs are installed. When the application programs are installed, this sequence of the operation by the information processing system 10 ends.

When the application programs are not yet installed, the application control unit 52 transmits a package usage request including the package identification information to the tenant setup system 44 (step S143). In response to acquiring the package usage request, the tenant management unit 60 transmits an email address confirmation screen to the image forming apparatus 20 (step S144). Subsequently, the first display unit 54 displays the obtained email address confirmation screen (steps S145, S146, and S147).

The user confirms an email address on the email address confirmation screen. When the email address is confirmed, the first display unit 54 displays a screen that enables the user to approve transmission of an email. For example, the image forming apparatus 20 displays an email transmission approval screen M as illustrated in FIG. 17.

Subsequently, the user performs an operation of approving email transmission on the email transmission approval screen (step S148). In response to accepting the operation of approving the email transmission on the email transmission approval screen, the first display unit 54 transmits the email transmission approval information including the registered mail address to the tenant setup system 44 (step S149). For example, when a send button on the email transmission approval screen M in FIG. 17 is pressed, the image forming apparatus 20 transmits the mail transmission approval information.

Subsequently, the tenant management unit 60 receives the email transmission approval information from the image forming apparatus 20. The tenant management unit 60 generates a package registration screen in accordance with the email transmission approval information. Then, the tenant management unit 60 stores the package registration screen so as to be accessible from an apparatus on the network, in association with the package identification information. Next, the tenant management unit 60 provides an email transmission request to the email transmission unit 66 (step S150). The email transmission request includes the registered email address and a network address for accessing the generated package registration screen. Subsequently, the email transmission unit 66 transmits a package installation email including the network address for accessing the package registration screen to the email address (step S151).

Next, the email transmission unit 66 notifies the tenant management unit 60 that transmission of the package installation email is completed (step S152). Subsequently, the tenant management unit 60 transmits an email transmission completion screen to the image forming apparatus 20 (step S153). The first display unit 54 displays the email transmission completion screen (step S154). For example, the email transmission completion screen N illustrated in FIG. 17 is displayed by the first display unit 54.

Next, the user operates the information processing apparatus 30 to check the package installation email (step S155). In response to the user's operation of checking the package installation email, the email receiving unit 68 receives the package installation email, and controls the second display unit 70 to display the content of the package installation email (step S156, S157, and S158). For example, the package installation email O illustrated in FIG. 18 is displayed by the information processing apparatus 30. The package installation email O illustrated in FIG. 18 includes, in a text section, a URL for accessing the package registration screen.

Next, the user starts up the browser program executed by the information processing apparatus 30 to access the network address included in the package installation email. Then, the user enters the package identification information on the screen displayed on the information processing apparatus 30, and performs an operation for transmitting the package registration request to the tenant setup system 44 (step S159).

In response to the user's operation for transmitting the package identification information, the second display unit 70 transmits the package registration request including the entered package identification information to the tenant setup system 44 (step S160). For example, the information processing apparatus 30 displays a confirmation screen P as illustrated in FIG. 18 that enables the user to confirm the application programs to be used. When a registration button on the confirmation screen P in FIG. 18 is pressed, the information processing apparatus 30 transmits the package registration request.

In response to acquiring the package registration request from the information processing apparatus 30, the tenant management unit 60 checks whether at least one application program included in the package identified by the package identification information is available (step S161). When the at least one application program is unavailable, the tenant management unit 60 sends a package unavailability notification screen back to the information processing apparatus 30. Then, the operation ends. In other words, when the at least one application program is unavailable, this sequence of the operation by the information processing system 10 ends.

When the at least one application program is available, subsequently, the tenant management unit 60 gives a package installation instruction including the tenant ID and the package identification information, to the application installation unit 64 (step S162). In response to reception of the package installation instruction, the application installation unit 64 installs a plurality of application programs included in the package identified by the package identification information into the tenant identified by the tenant ID. For example, the application installation unit 64 installs the plurality of application programs included in the package into the tenant. Upon completion of the installation of the application programs, the application installation unit 64 notifies the tenant management unit 60 that the installation is completed (step S163).

Next, the tenant management unit 60 transmits a registration completion screen to the information processing apparatus 30 (step S164). Subsequently, the second display unit 70 displays the registration completion screen obtained from the tenant setup system 44 (steps S165, S166). For example, the registration completion screen Q illustrated in FIG. 18 is displayed by the information processing apparatus 30.

Further, the tenant management unit 60 may give an email transmission request including the registration information to the email transmission unit 66. In response to reception of the email transmission request, the email transmission unit 66 transmits a registration completion email to the registered email address. For example, a screen such as the registration completion email R illustrated in FIG. 18 is transmitted by the information processing apparatus 30.

Upon completion of the process of the step S166, the operation by the information processing system 10 for installing a plurality of application programs into a tenant that is set up ends.

Figure 19:
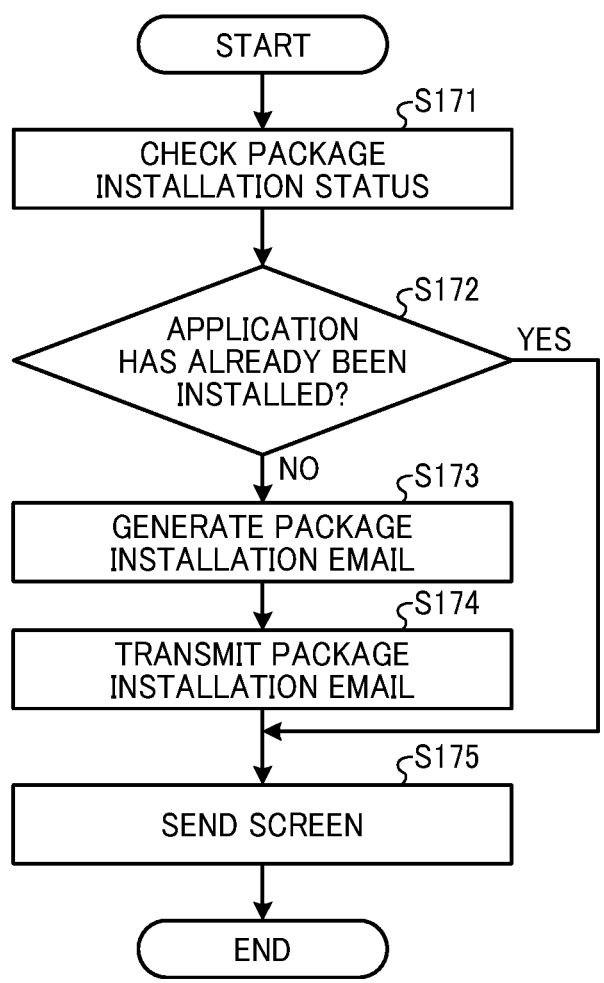
FIG. 19 is a flowchart illustrating an operation performed by the image forming apparatus according to the sixth variation.

FIG. 19 is a flowchart illustrating an operation performed by the image forming apparatus 20 according to the sixth variation. In the sixth variation, the image forming apparatus 20 may perform the operation illustrated in FIG. 19 in response to accepting an operation by the user for requesting usage of the package.

First, the application control unit 52 checks an installation status of application programs included in a package (step S171). Subsequently, the application control unit 52 determines whether the application programs included in the package are installed (step S172). When the application programs are installed (S172: YES), the operation proceeds to the step S175.

When the application programs are not yet installed (S172: NO), the application control unit 52 generates the package installation email (step S173). Next, the application control unit 52 transmits the generated package installation email to the registered email address (step S174). Upon completion of the process of S174, the operation by the application control unit 52 proceeds to the step S175.

In the step S175, the application control unit 52 controls the first display unit 54 to display a screen indicating that the package installation email is transmitted.

The information processing system 10 according to the sixth variation as described enables an operation from the information processing apparatus 30 to control the tenant setup system 44 to obtain a package even after the setup of a tenant. Thus, according to the information processing system 10 according to the sixth variation, a plurality of application programs are installed in a simple manner by operating the information processing apparatus 30.

<Hardware Configuration>

Figure 20:
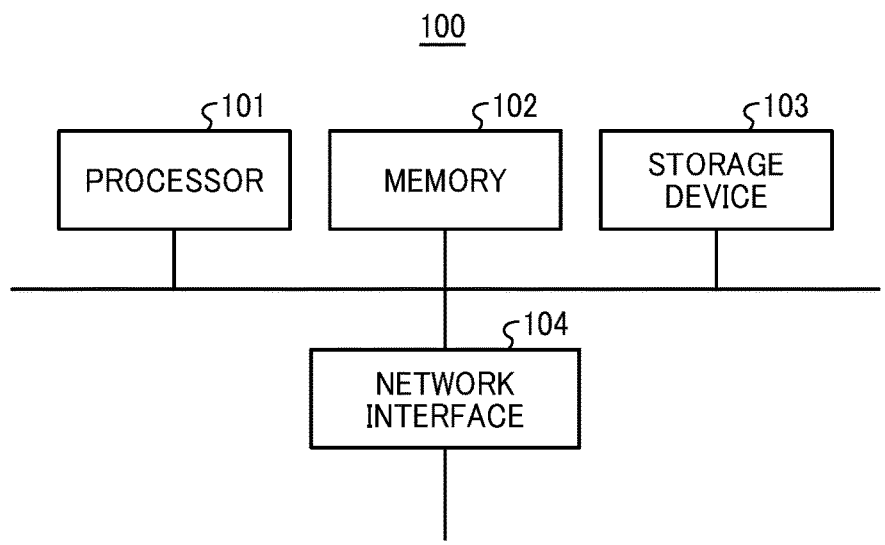
FIG. 20 is a block diagram illustrating an example of a hardware configuration of one server apparatus constituted as at least a part of a cloud system according to an embodiment of the present disclosure.

FIG. 20 is a block diagram illustrating an example of a hardware configuration of one server apparatus 100 constituted as at least a part of the cloud system 40.

The cloud system 40 includes one or more server apparatuses 100. Each server apparatus 100 has a hardware configuration as illustrated in FIG. 20, for example. The server apparatus 100 includes a processor 101, a memory 102, a storage device 103, and a network interface 104.

The processor 101 includes one or more central processing units (CPUs) and the like. The memory 102 includes a random access memory (RAM), a read only memory (ROM), and the like. The storage device 103 includes a hard disc drive (HDD) and the like. The network interface 104 exchanges data (information) with one or more other apparatuses via a network. The server apparatus 100 as described provides a service to the image forming apparatus 20 by the processor 101 executing an operating system, an application program, and the like stored in the storage device 103 in advance.

The program executed by the tenant setup system 44 according to the embodiments of the present disclosure is stored in a computer-readable storage medium such as a compact disc-ROM (CD-ROM), flexible disc (FD), compact disc-recordable (CD-R), and digital versatile disc (DVD), in an installable or executable file format, for distribution. Further, the program executed by the tenant setup system 44 according to the embodiments of the present disclosure may be stored on a computer connected to a network such as the Internet and downloaded via the network. Furthermore, the program executed by the tenant setup system 44 according to the embodiments of the present disclosure may be provided or distributed via a network such as the Internet. Further, a program according to the embodiments of the present disclosure may be provided as being preloaded in a ROM and the like.

A program for enabling the server apparatus 100 to function as the tenant setup system 44 includes a tenant setup module, a tenant management module, a user management module, an application installation module, and an email transmission module. In the server apparatus 100, each of the modules is loaded on a main memory by the processor 101 reading out the program from a storage medium (e.g., the storage device 103) and executing the program. Thus, the processor 101 functions as the tenant setup unit 58, the tenant management unit 60, the user management unit 62, the application installation unit 64, and the email transmission unit 66. It should be noted that some of or all of the tenant setup unit 58, the tenant management unit 60, the user management unit 62, the application installation unit 64 and the email transmission unit 66 may be implemented by hardware other than the processor.

Figure 21:
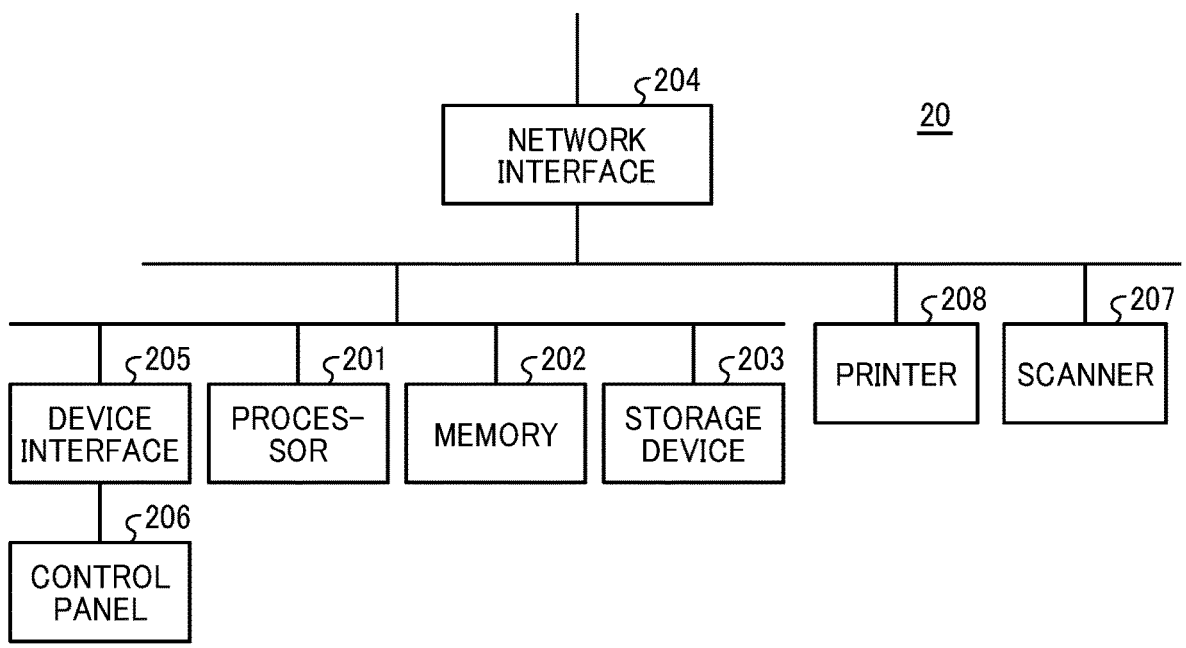
FIG. 21 is a block diagram illustrating an example of a hardware configuration of the image forming apparatus according to an embodiment of the present disclosure.

FIG. 21 is a block diagram illustrating an example of a hardware configuration of the image forming apparatus 20. The image forming apparatus 20 includes a processor 201, a memory 202, a storage device 203, a network interface 204, a device interface 205, a control panel 206, a scanner 207, and a printer 208.

The processor 201 includes one or more CPUs and the like. The memory 202 includes a RAM, a ROM, and the like. The storage device 203 includes an HDD and the like. The network interface 204 exchanges data (information) with one or more other apparatuses via a network. The device interface 205 is an interface with control panel 206. The control panel 206 is an input/output device such as a touch panel.

The scanner 207 scans characters, images, and the like printed on a sheet of paper or the like, and converts the scanned characters, images, and the like into data. The printer 208 prints characters, images, and the like on a sheet of paper or the like in accordance with print data. It should be noted that the image forming apparatus 20 may include any one of the scanner 207 and the printer 208.

The processor 201 controls the scanner 207 and the printer 208 according to an operation by a user to the control panel 206. The processor 201 executes a browser program on the operating system. Then, the processor 201 executes the browser program to provide a user interface for operating the scanner 207 and the printer 208. In addition, the processor 201 communicates with the cloud system 40 on the browser program.

According to the embodiments and variations of the present disclosure, it is possible to install a plurality of application programs in a simple manner.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing system, comprising:
a client apparatus;
an information processing apparatus; and
a service providing system communicable with the client apparatus and the information processing apparatus via a network, wherein
the client apparatus includes first circuitry configured to
transmit, to the service providing system, a package acquisition request for obtaining a package including an application program;
obtain, from the service providing system, the application program included in the package; and
after user authentication in the service providing system using the application program, transmit a package registration request to the service providing system; and
the service providing system includes second circuitry configured to:
in response to receiving a request from the information processing apparatus, set up a tenant in the service providing system;
receive, from the client apparatus, the package registration request for registering the package in the tenant;
in response to acquiring the package registration request from the client apparatus, determine whether the package is available; and
when determining that the package is available, install the application program included in the package into the tenant.

2. The information processing system of claim 1, wherein the second circuitry is further configured to:

receive, from the client apparatus, an email address and a tenant setup request;
generate a usage registration screen in accordance with the tenant setup request;
transmit an email addressed to the received email address, the email including a network address for accessing the usage registration screen;
receive an access to the usage registration screen from an information processing apparatus;
determine whether the received email address is registered, based on a determination that the received email address is not registered, transmit the email addressed to the received email address, the email including the network address, and
based on a determination that the received email address is registered, transmit a denial-of-registration email indicating that registration is denied to the received email address.

3. The information processing system of claim 2, wherein the second circuitry is further configured to:
set an expiration date to the usage registration screen;
check the expiration date in response to the access to the usage registration screen by the information processing apparatus;
transmit the usage registration screen to the information processing apparatus based on a check result indicating that the expiration date is not expired; and
transmit an expiration notification screen indicating that the expiration date is expired to the information processing apparatus based on a check result indicating that the expiration date is expired.

4. The information processing system of claim 2, wherein the second circuitry is further configured to transmit a package unavailability notification screen indicating that the package is not available, based on a check result indicating that the application program is unavailable.

5. The information processing system of claim 2, wherein the second circuitry is further configured to:
register a user based on information obtained from the information processing apparatus via the usage registration screen;
transmit, to the information processing apparatus, an additional user registration screen for registering an additional user after the application program is registered with the tenant; and
register the additional user based on information obtained from the information processing apparatus via the additional user registration screen.

6. The information processing system of claim 2, wherein the first circuitry is further configured to transmit the package registration request including package identification information after the tenant is set up, and
the second circuitry is further configured to perform the registering of the application program included in the package identified by the package identification information with the tenant.

7. The information processing system of claim 2, wherein the first circuitry is further configured to transmit the email address and a package usage request to the service providing system, in response to accepting a request made by a user for using the package after the tenant is set up, and
the second circuitry is further configured to
generate a package registration screen in response to the package usage request;

transmit a package registration email including a network address for accessing the package registration screen to the email address;
receive an access to the package registration screen from the information processing apparatus through the network; and
perform the registering of the application program included in the package identified by package identification information with the tenant, in response to acquisition of the package identification information from the information processing apparatus via the package registration screen.

8. A service providing system, comprising:
circuitry configured to
in response to receiving a request from an information processing apparatus, set up a tenant in the service providing system;
receive, from a client apparatus, a package registration request for registering a package in the tenant;
in response to acquiring the package registration request from the client apparatus, determine whether the package is available; and
when determining that the package is available, install an application program included in the package into the tenant.

9. The service providing system of claim 8, wherein the circuitry is further configured to:
receive, from the client apparatus, an email address and a tenant setup request;
generate a usage registration screen in accordance with the tenant setup request;
transmit an email addressed to the received email address, the email including a network address for accessing the usage registration screen;
receive an access to the usage registration screen from an information processing apparatus;
determine whether the received email address is registered,
based on a determination that the received email address is not registered, transmit the email addressed to the received email address, the email including the network address, and
based on a determination that the received email address is registered, transmit a denial-of-registration email indicating that registration is denied to the received email address.

10. The service providing system of claim 9, wherein the circuitry is further configured to:
set an expiration date to the usage registration screen;
check the expiration date in response to the access to the usage registration screen by the information processing apparatus;
transmit the usage registration screen to the information processing apparatus based on a check result indicating that the expiration date is not expired; and
transmit an expiration notification screen indicating that the expiration date is expired to the information processing apparatus based on a check result indicating that the expiration date is expired.

11. The service providing system of claim 9, wherein the circuitry is further configured to transmit a package unavailability notification screen indicating that the package is not available, based on the check result indicating that the application program is unavailable.

12. The service providing system of claim 9, wherein the circuitry is further configured to:

register a user based on information obtained from the information processing apparatus via the usage registration screen;
transmit, to the information processing apparatus, an additional user registration screen for registering an additional user after the application program is registered with the tenant; and
register the additional user based on information obtained from the information processing apparatus via the additional user registration screen.

13. The service providing system of claim 9, wherein the circuitry is further configured to:
receive, from the client apparatus, a package registration request including package identification information after the tenant is set up; and
perform the registering the application program included with the package identified by the package identification information into the tenant.

14. The service providing system of claim 9, wherein the circuitry is further configured to:
receive the email address and a package usage request from the client apparatus, in response to accepting a request made by a user after the tenant has been set up;
generate a package registration screen in response to the package usage request;
transmit a package registration email including a network address for accessing the package registration screen to the email address;
receive an access to the package registration screen from the information processing apparatus through a network; and
perform the registering of the application program included in the package identified by package identification information with the tenant, in response to acquisition of the package identification information from the information processing apparatus via the package registration screen.

15. An information processing method performed by a service providing system that is communicable with a client apparatus and an information processing apparatus via a network, the method comprising:
in response to receiving a request from the information processing apparatus, setting up a tenant in the service providing system;
receiving, from a client apparatus, a package registration request for registering a package in the tenant;
in response to acquiring the package registration request from the client apparatus, determining whether the package is available; and
when determining that the package is available, installing an application program included in the package into the tenant.

16. The information processing method of claim 15, further comprising:
receiving, from the client apparatus, an email address and a tenant setup request;
generating a usage registration screen in accordance with the tenant setup request;
transmitting a usage registration email addressed to the received email address, the email including a network address for accessing the usage registration screen to the email address;
receiving an access to the usage registration screen from an information processing apparatus;
determining whether the received email address is registered;

transmitting the email addressed to the received email address, the email including the network address, based on a determination that the received email address is not registered; and transmitting a denial-of-registration email indicating that registration is denied to the received email address, based on a determination that the received email address is registered.

17. The information processing method of claim 16, further comprising:

setting an expiration date to the usage registration screen;

checking the expiration date in response to the access to the usage registration screen by the information processing apparatus;

transmitting the usage registration screen to the information processing apparatus based on a check result indicating that the expiration date is not expired; and transmitting an expiration notification screen indicating that the expiration date is expired to the information processing apparatus based on a check result indicating that the expiration date is expired.

18. The information processing method of claim 16, further comprising:

transmitting a package unavailability notification screen indicating that the package is not available, based on the check result indicating that the application program is unavailable.

19. The information processing method of claim 16, further comprising:

registering a user based on information obtained from the information processing apparatus via the usage registration screen;

transmitting, to the information processing apparatus, an additional user registration screen for registering an additional user after the application program is registered with the tenant; and registering the additional user based on information obtained from the information processing apparatus via the additional user registration screen.

20. The information processing method of claim 16, further comprising:

receiving, from the client apparatus, a package registration request including package identification information after the tenant is set up; and performing registering of the at least one application program included in the package identified by the package identification information with the tenant.

\* \* \* \* \*